(12) United States Patent
McMahon et al.

(10) Patent No.: US 8,953,289 B2
(45) Date of Patent: *Feb. 10, 2015

(54) ELECTRICAL WIRING DEVICE

(71) Applicant: Pass & Seymour, Inc., Syracuse, NY (US)

(72) Inventors: Michael F. McMahon, East Syracuse, NY (US); Kent R. Morgan, Groton, NY (US); David A. Finlay, Sr., Marietta, NY (US); Thomas N. Packard, Syracuse, NY (US); Richard Weeks, Little York, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/970,254

(22) Filed: Aug. 19, 2013

(65) Prior Publication Data

US 2013/0335866 A1    Dec. 19, 2013

Related U.S. Application Data

(63) Continuation of application No. 12/369,337, filed on Feb. 11, 2009, now Pat. No. 8,514,529, which is a continuation-in-part of application No. 11/469,596, filed on Sep. 1, 2006, now Pat. No. 7,619,860, which is (Continued)

(51) Int. Cl.
*H02H 3/00* (2006.01)
*H02H 3/33* (2006.01)

(52) U.S. Cl.
CPC ..................... *H02H 3/338* (2013.01)
USPC ............................................................ 361/42

(58) Field of Classification Search
CPC ......... H02H 3/33; H02H 3/335; H02H 3/338; H02H 1/0015; H02H 3/00; H01H 83/04
See application file for complete search history.

(56) References Cited

U.S. PATENT DOCUMENTS

| | | | |
|---|---|---|---|
| 3,983,554 A | 9/1976 | Goode |
| 4,477,857 A | 10/1984 | Crocker |
| 4,618,907 A | 10/1986 | Leopold |
| 5,177,657 A | 1/1993 | Baer |
| 5,363,083 A | 11/1994 | Fischer |
| 5,363,269 A | 11/1994 | McDonald |

(Continued)

FOREIGN PATENT DOCUMENTS

| | | |
|---|---|---|
| WO | 2007027908 | 3/2007 |
| WO | 2007056668 | 5/2007 |

(Continued)

OTHER PUBLICATIONS

See Re-examination of US Patent No. 7,283,340, control No. 95/000,477; 95/001,224 (merged).

*Primary Examiner* — Jared Fureman
*Assistant Examiner* — Terrence Willoughby
(74) *Attorney, Agent, or Firm* — Daniel P. Malley; Bond Schoeneck & King, PLLC

(57) ABSTRACT

The present invention is directed to an electrical wiring device that includes a detection assembly coupled to a plurality of line terminals and a plurality of load terminals, the detection assembly being configured to detect a wiring state associated with the plurality of line terminals and the plurality of load terminals. The detection assembly includes a primary wiring state detection circuit coupled to the plurality of line terminals, and a secondary wiring state detection circuit coupled to the plurality of load terminals.

52 Claims, 14 Drawing Sheets

Related U.S. Application Data a continuation of application No. 10/884,304, filed on Jul. 2, 2004, now Pat. No. 7,133,266, which is a continuation of application No. 09/971,525, filed on Oct. 5, 2001, now Pat. No. 6,856,498, which is a continuation of application No. 09/718,003, filed on Nov. 21, 2000, now Pat. No. 6,522,510.

(56) References Cited

U.S. PATENT DOCUMENTS

| | | |
|---|---|---|
| 5,418,678 A | 5/1995 | McDonald |
| 5,477,412 A | 12/1995 | Neiger |
| 5,541,800 A | 7/1996 | Misencik |
| 5,600,524 A | 2/1997 | Neiger |
| 5,638,243 A | 6/1997 | Torezan |
| 5,661,623 A | 8/1997 | McDonald |
| 5,706,155 A | 1/1998 | Neiger |
| 5,708,551 A | 1/1998 | Bosatelli |
| 5,715,125 A | 2/1998 | Neiger |
| 5,923,239 A | 7/1999 | Krueger |
| 6,043,966 A | 3/2000 | Krueger |
| 6,052,265 A | 4/2000 | Zaretsky |
| 6,111,733 A | 8/2000 | Neiger |
| 6,262,871 B1 | 7/2001 | Nemir |
| 6,317,307 B1 | 11/2001 | Bone |
| 6,407,893 B1 | 6/2002 | Neiger |
| 6,437,953 B2 | 8/2002 | Disalvo |
| 6,492,894 B2 | 12/2002 | Bone |
| 6,522,510 B1 | 2/2003 | Finlay |
| 6,587,319 B1 | 7/2003 | Finlay |
| 6,590,753 B1 | 7/2003 | Finlay |
| 6,628,486 B1 | 9/2003 | MacBeth |
| 6,721,156 B2 | 4/2004 | Masghati |
| 6,724,590 B1 | 4/2004 | Radosavljevic |
| 6,734,769 B1 | 5/2004 | Germain |
| 6,788,508 B2 | 9/2004 | Papallo, Jr. |
| 6,850,394 B2 | 2/2005 | Kim |
| 6,856,498 B1 | 2/2005 | Finlay, Sr. |
| 6,900,972 B1 | 5/2005 | Chan |
| 6,937,452 B2 | 8/2005 | Chan |
| 7,084,725 B2 | 8/2006 | Richter |
| 7,088,205 B2 | 8/2006 | Germain |
| 7,098,761 B2 | 8/2006 | Germain |
| 7,099,129 B2 | 8/2006 | Neiger |
| 7,116,191 B2 | 10/2006 | Wang |
| 7,133,266 B1 | 11/2006 | Finlay, Sr. |
| 7,149,065 B2 | 12/2006 | Baldwin |
| 7,154,718 B1 | 12/2006 | Finlay, Sr. |
| 7,161,780 B2 | 1/2007 | Germain |
| 7,164,563 B2 | 1/2007 | Chan |
| 7,167,066 B2 | 1/2007 | Wang |
| 7,184,250 B2 | 2/2007 | Bonilla |
| 7,187,526 B2 | 3/2007 | Disalvo |
| 7,195,500 B2 | 3/2007 | Huang |
| 7,196,886 B2 | 3/2007 | Chan |
| 7,209,330 B2 | 4/2007 | Disalvo |
| 7,212,386 B1 | 5/2007 | Finlay, Sr. |
| 7,227,435 B2 | 6/2007 | Germain |
| 7,239,491 B1 | 7/2007 | Morgan |
| 7,256,973 B1 | 8/2007 | Radosavljevic |
| 7,265,956 B2 | 9/2007 | Huang |
| 7,283,340 B1 | 10/2007 | Finlay, Sr. |
| 7,289,306 B2 | 10/2007 | Huang |
| 7,292,419 B1 | 11/2007 | Nemir |
| 7,295,410 B1 | 11/2007 | Packard |
| 7,295,415 B2 | 11/2007 | Huang |
| 7,298,598 B1 | 11/2007 | Morgan |
| 7,307,821 B2 | 12/2007 | Wang |
| 7,312,963 B1 | 12/2007 | Radosavljevic |
| 7,315,227 B2 | 1/2008 | Huang |
| 7,317,600 B2 | 1/2008 | Huang |
| 7,336,457 B2 | 2/2008 | Liscinsky |
| 7,336,458 B2 | 2/2008 | Ziegler |
| 7,355,497 B2 | 4/2008 | Germain |
| 7,355,827 B2 | 4/2008 | Wang |
| 7,365,621 B2 | 4/2008 | Germain |
| 7,375,938 B1 | 5/2008 | Radosavljevic |
| 7,400,477 B2 | 7/2008 | Campolo |
| 7,400,479 B2 | 7/2008 | Disalvo |
| 7,403,086 B2 | 7/2008 | Wu |
| 7,408,432 B2 | 8/2008 | Shi |
| 7,411,766 B1 | 8/2008 | Huang |
| 7,414,499 B2 | 8/2008 | Germain |
| 7,414,818 B2 | 8/2008 | Shi |
| 7,439,833 B2 | 10/2008 | Germain |
| 7,463,124 B2 | 12/2008 | DiSalvo |
| 7,492,558 B2 | 2/2009 | Germain |
| 7,492,559 B2 | 2/2009 | Zhang |
| 7,498,909 B2 | 3/2009 | Zhang |
| 7,498,910 B2 | 3/2009 | Gallas |
| 7,515,024 B2 | 4/2009 | Chen |
| 7,525,402 B2 | 4/2009 | Gao |
| 7,525,441 B2 | 4/2009 | Zhang |
| 7,535,371 B2 | 5/2009 | Wang |
| 7,538,647 B2 | 5/2009 | Leopold |
| 7,538,993 B2 | 5/2009 | Huang |
| 7,538,994 B2 | 5/2009 | Bonilla |
| 7,542,252 B2 | 6/2009 | Chan |
| 7,545,244 B2 | 6/2009 | Disalvo |
| 8,054,590 B2 | 11/2011 | Li |
| 2004/0027739 A1 | 2/2004 | Radosavljevic |
| 2004/0223272 A1 | 11/2004 | Germain |
| 2006/0139132 A1 | 6/2006 | Porter |
| 2006/0181373 A1 | 8/2006 | Germain |
| 2006/0268472 A1 | 11/2006 | Winch |
| 2006/0279886 A1 | 12/2006 | Huang |
| 2006/0285262 A1 | 12/2006 | Neiger |
| 2007/0014058 A1 | 1/2007 | Chan |
| 2007/0030608 A1 | 2/2007 | Baldwin |
| 2007/0035898 A1 | 2/2007 | Baldwin |
| 2007/0053118 A1 | 3/2007 | Germain |
| 2007/0133136 A1 | 6/2007 | Germain |
| 2007/0188955 A1 | 8/2007 | Elms |
| 2007/0215576 A1 | 9/2007 | Chung |
| 2007/0230072 A1 | 10/2007 | Zhang |
| 2007/0268635 A1 | 11/2007 | Bonasia |
| 2007/0274012 A1 | 11/2007 | Bonasia |
| 2008/0007879 A1 | 1/2008 | Zaretsky |
| 2008/0022153 A1 | 1/2008 | Wang |
| 2008/0024252 A1 | 1/2008 | Gallas |
| 2008/0024945 A1 | 1/2008 | Gao |
| 2008/0094765 A1 | 4/2008 | Huang |
| 2008/0112099 A1 | 5/2008 | Li |
| 2008/0123227 A1 | 5/2008 | Bonasia |
| 2008/0170341 A1 | 7/2008 | Huang |
| 2008/0186642 A1 | 8/2008 | Campolo |
| 2008/0225448 A1 | 9/2008 | Li |
| 2008/0272925 A1 | 11/2008 | Griffin |
| 2009/0052098 A1 | 2/2009 | Disalvo |
| 2009/0086389 A1 | 4/2009 | Huang |
| 2009/0091869 A1 | 4/2009 | Huang |
| 2009/0128264 A1 | 5/2009 | Disalvo |

FOREIGN PATENT DOCUMENTS

| | | |
|---|---|---|
| WO | 2007093885 | 8/2007 |
| WO | 2007137180 | 11/2007 |
| WO | 2007143576 | 12/2007 |
| WO | 2008005928 | 1/2008 |

ELECTRICAL WIRING DEVICE

CROSS-REFERENCE TO RELATED APPLICATIONS

This is a continuation of U.S. patent application Ser. No. 12/369,337 filed Feb. 11, 2009, which is a continuation-in-part of U.S. patent application Ser. No. 11/469,596, filed on Sep. 1, 2006, now U.S. Pat. No. 7,619,860, which is a continuation of U.S. patent application Ser. No. 10/884,304 filed on Jul. 2, 2004, now U.S. Pat. No. 7,133,266, which is a continuation of U.S. Pat. No. 6,856,498 filed on Oct. 5, 2001, which is a continuation of U.S. Pat. No. 6,522,510 filed Nov. 21, 2000, the contents of which are relied upon and incorporated herein by reference in their entirety, and the benefit of priority under 35 U.S.C. §120 is hereby claimed.

BACKGROUND OF THE INVENTION

1. Field of the Invention

The present invention relates generally to electrical wiring devices, and particularly to protective wiring devices.

2. Technical Background

An electrical distribution system provides power to a house, building or some other facility. Electrical wiring from a power utility provides AC power to one or more breaker panels disposed in the structure. The breaker panel distributes AC power to one or more branch electric circuits installed in the structure. The electric circuits may typically include one or more receptacle outlets and may further transmit AC power to one or more electrically powered devices, commonly referred to in the art as load circuits. The receptacle outlets provide power to user-accessible loads that include a power cord and plug, the plug being insertable into the receptacle outlet. However, certain types of faults have been known to occur in electrical wiring systems. Accordingly, each electric circuit typically employs one or more electric circuit protection devices.

There are several types of electric circuit protection devices. For example, such devices include ground fault circuit interrupters (GFCIs), ground-fault equipment protectors (GFEPs), and arc fault circuit interrupters (AFCIs). This list includes representative examples and is not meant to be exhaustive. Some devices include both GFCIs and AFCIs. As their names suggest, arc fault circuit interrupters (AFCIs), ground-fault equipment protectors (GFEPs) and ground fault circuit interrupters (GFCIs) perform different functions.

A ground fault occurs when a current carrying (hot) conductor creates an unintended current path to ground. A differential current is created between the hot/neutral conductors because some of the current flowing in the circuit is diverted into the unintended current path. The unintended current path represents an electrical shock hazard. A ground fault may occur for several reasons. First, the hot conductor may contact ground if the electrical wiring insulation within a load circuit becomes damaged. This scenario represents a shock hazard. For example, if a user comes into contact with a hot conductor while simultaneously contact ground, the user will experience a shock. A ground fault may also occur when the equipment comes in contact with water. A ground fault may also result from damaged insulation within the electrical power distribution system.

A ground fault creates a differential current between the hot conductor and the neutral conductor. Under normal operating conditions, the current flowing in the hot conductor should equal the current in the neutral conductor. Most GFCIs are configured to take advantage of this fact by comparing the current in the hot conductor to the current in the neutral conductor by sensing the differential current between the two conductors. The GFCI is sensitive to differential currents that represent an imminently dangerous condition, such as the presence of a current path other than the intended path of normal operation (i.e., a shock hazard). Accordingly, when the differential current exceeds a predetermined threshold, usually about 6 mA, the GFCI typically responds by interrupting the circuit. Circuit interruption is typically effected by opening a set of contacts disposed between the source of power and the load. The GFCI may also respond by actuating an alarm of some kind.

One problem associated with protective devices relates to the device being miswired in the filed by an installer. Miswiring refers to a situation wherein the installer couples the line terminals to the load and couples the load terminals to the AC power source. Miswiring may result in the protective device not protecting the user from the fault conditions described above. Labels and installation instruction sheets have been used to prevent miswiring. However, instructive material may be ignored by an installer.

Another problem is that protective device, like all electrical devices, have a limited life expectancy. When the device has reached end of life, the user may not be protected from the fault condition. Test buttons have been incorporated into protective devices to provide the user with a means for testing the effectiveness of the device. One drawback to this approach lies in the fact that if the user fails to use the test button, the user will not know if the device is functional.

Transient voltages are known to damage a protective device/cause an end of life condition. As a frame of reference, the power source of the electrical distribution system includes at least one phase voltage that propagates by way of the hot line in a properly wired device. Transient voltages, on the other hand, may likewise propagate in the electrical distribution system. However, the peak amplitudes of the transient voltages are typically greater than the phase voltage amplitude by an order of magnitude. Transient voltages may be generated in a number of ways. For example, transient voltages may be generated by lightning storms. Transient voltages may also be produced when an inductive load coupled to the electrical distribution system is turned off, or by a motor coupled to the electrical distribution system that includes commutators and brushes. Whatever the cause, transient voltages are known to damage a protective device and cause an end of life condition.

What is needed, therefore, is a protective device that addresses the miswiring issue by detecting the wiring state of the device and inhibiting device operation if the device is miswired. What is also needed is a protective device that includes circuitry that more effectively guards against damage from transient voltage surges.

SUMMARY OF THE INVENTION

The present invention addresses the needs described above by providing a protective device that addresses the miswiring issue by detecting the wiring state of the device and inhibiting device operation if the device is miswired.

One aspect of the present invention is directed to an electrical wiring device that includes a plurality of line terminals configured to be connected to a source of AC power, and a plurality of load terminals configured to be connected to at least one electrical load. A detection assembly is coupled to the plurality of line terminals and the plurality of load terminals, the detection assembly being configured to detect a wiring state associated with the plurality of line terminals and the plurality of load terminals, the detection assembly including a primary wiring state detection circuit coupled to the plurality of line terminals, and a secondary wiring state detection circuit coupled to the plurality of load terminals. A circuit interrupting assembly includes four sets of interrupting contacts that are configured to provide an electrically continuous path between the plurality of line terminals and the plurality of load terminals in a reset state and interrupt the electrically continuous path in a tripped state, wherein the plurality of line terminals and the plurality of load terminals are substantially isolated from each other in the tripped state.

In another aspect, the present invention is directed to an electrical wiring device that includes a plurality of line terminals configured to be connected to a source of AC power and a plurality of load terminals configured to be connected to at least one electrical load. A detection assembly is coupled to the plurality of line terminals, the detection assembly being configured to detect a wiring state associated with the plurality of line terminals and the plurality of load terminals, the detection assembly including a primary wiring state detection circuit configured to be coupled to the plurality of line terminals before a proper wiring state is detected, detect an initial proper wiring state and permanently decouple from the plurality of line terminals in response to detecting the initial proper wiring state. A circuit interrupting assembly includes four sets of interrupting contacts that are configured to provide electrical continuity between the line terminals and the plurality of load terminals in a reset state and configured to substantially interrupt the electrical continuity in a tripped state.

In yet another aspect, the present invention is directed to a method that includes the steps of: providing an electrical wiring device including a plurality of line terminals configured to be connected to a source of AC power and a plurality of load terminals configured to be connected to at least one electrical load, the device also including a circuit interrupting assembly having four sets of interrupting contacts that are configured to provide an electrically continuous path between the plurality of line terminals and the plurality of load terminals in a reset state and interrupt the electrically continuous path in a tripped state, wherein the plurality of line terminals and the plurality of load terminals are substantially isolated from each other in the tripped state; enabling a first wiring state detection structure to automatically trip a circuit interrupting assembly when there is a miswired condition; and disabling the first wiring state detection structure once there is a properly wired condition.

In yet another aspect, the present invention is directed to an electrical wiring device that includes a plurality of line terminals configured to be connected to a source of AC power and a plurality of load terminals configured to be connected to at least one electrical load. A circuit interrupting assembly includes four sets of interrupting contacts that are configured to provide electrical continuity between the line terminals and the load terminals in a reset state and configured to substantially interrupt the electrical continuity in a tripped state. A fault detection assembly is coupled to the plurality of line terminals configured to detect at least one fault condition in the at least one electrical load and drive the circuit interrupting assembly to the tripped state in response to the detection of the at least one fault condition. A wiring state detection assembly is coupled to the fault detection assembly, the wiring state detection assembly being configured to detect a wiring state associated with the plurality of line terminals and the plurality of load terminals, the wiring state detection assembly including a first circuit including a user-accessible manual switch coupled to a memory structure, a wiring state being read before an actuation of the manual switch and stored in the memory structure, the first circuit being configured to prevent the circuit interrupting assembly from maintaining the reset state after the manual switch is actuated if the wiring state is indicative of a miswired state.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
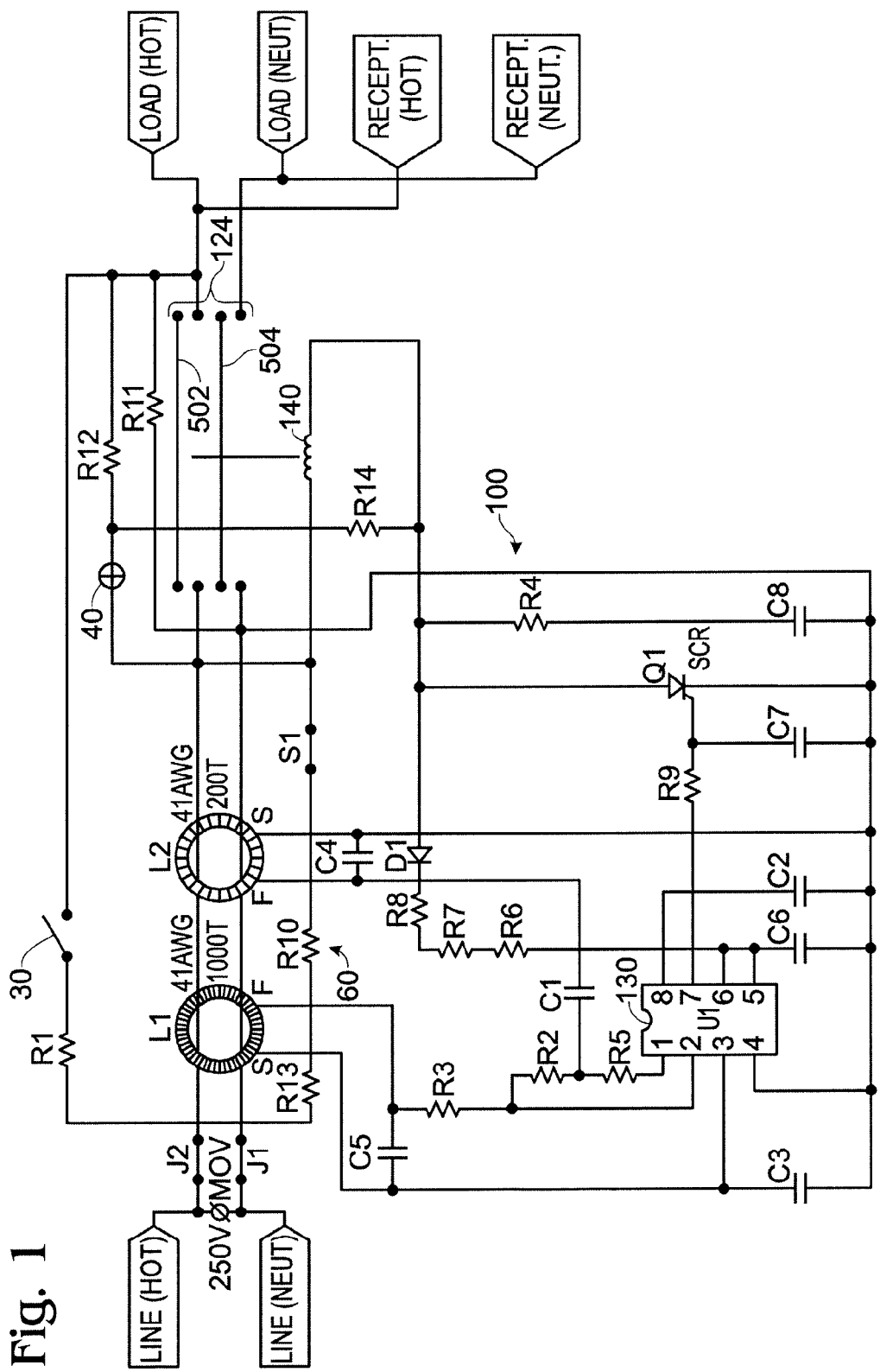
FIG. 1 is a schematic of a GFCI circuit with miswire protection and an indicator lamp according to an embodiment of the invention.

Reference will now be made in detail to the present embodiments of the invention, examples of which are illustrated in the accompanying drawings. Wherever possible, the same reference numbers will be used throughout the drawings to refer to the same or like parts. An exemplary embodiment of the wiring device of the present invention is shown in FIG. 1, and is designated generally throughout by reference numeral 100.

As embodied herein and depicted in FIG. 1, a schematic of a GFCI circuit 100 with miswire protection circuit 60 and an indicator lamp 40 in accordance with an embodiment of the invention is disclosed. The GFCI 100 includes sensing transformers L1 and L2. These transformers are coupled to detector U1. The ground fault circuit sensing electronics of GFCI circuit 100 derives power from the line side terminals of the GFCI.

When differential transformer L1 senses unequal amounts of current flowing in the hot and neutral conductors due to a ground fault condition, circuit 100 causes a breaker coil 140 to activate, opening circuit interrupting mechanism 124. Circuit interrupting mechanism 124 includes hot and neutral bus bars 502, 504 that make and break contact with the hot and neutral power lines, respectively. The circuit interrupting mechanism 124 includes four sets of contacts that couple the bus bars to the hot line conductive path to the hot load conductive path and the neutral line conductive path to the neutral load conductive path. As shown in FIG. 1, each bus bar includes two sets of contacts that bridge a line conductive path to a corresponding load conductive path.

GFCI 100 includes a test button 30 induces a simulated ground fault when pushed in and causes breaker coil 140 to activate. In other words, the simulated ground fault generates a differential signal that is sensed and detected by the GFCI circuitry.

GFCI 100 is also equipped with a wiring state detection circuit that includes a fault resistance (R10, R13) that generates a differential current on the primary of the differential current transformer L1 when the GFCI 100 is miswired. The miswire differential current exceeds the level of differential current that the GFCI has been designed to interrupt, typically 6 milliamperes. The fault resistance R10, R13 is on the line side of interrupting contacts 124 electrically located between the line and load terminals of the hot and neutral wire paths. If GFCI 100 is miswired such that power is supplied to the load terminals and GFCI 100 is tripped the detection circuit does not provide a visible miswire indication. Accordingly, the user will attempt to reset the device. At this point, the miswire circuit will generate a differential current and the device will immediately trip. Thus, the device trips every time the user attempts to reset it, signaling to the user that the device is miswired.

When electrical power is correctly connected to the line terminals, it will trip only once (if it is in the reset state). If the device is already in the tripped state, nothing visible happens. Once the device is reset, it will not trip again unless it is responding to a test input or a true fault condition.

The wiring state detection circuit operates as follows. The current that flows through the fault resistance (R10, R13) is derived from the line terminal side of the device. When electrical power is correctly connected to the line terminals, the miswire circuit generates a differential current. If the device is in the reset state, the device will trip in response to the differential current. However, current continues to flow through fault resistance R10, R13 even if the interrupting contacts 124 are open. The differential current generated by the fault resistance clears itself in a short time, typically about 300 ms. The clearance timing is effected by selecting a resistor or resistors whose power rating is greatly exceeded by the current. Thus, the resistor or resistors will open after the predetermined time has elapsed. The estimated time it takes for the fault resistors R10, R13 to "clear" or burn out is greater than 50 ms and typically about 300 ms. After the fault resistance clears, the device may be reset. It will not trip again unless it is responding to a test input or a true fault condition. If the device is already in the tripped condition before power is applied, the wiring state detection circuit again generates the differential current despite the fact that the device is already tripped and the process described above occurs without the intermediate tripping step. This, of course, occurs without the user's knowledge because nothing appears to be happening in the GFCI.

On the other hand, the current flow is interrupted when the device trips in the miswired state. This is because, as noted above, the detection circuit derives power from the line side. Because the trip time of the GFCI is less than or equal to 25 ms, fault resistors R10, R13 do not have enough time to clear. If one attempts to reset the device when in the miswired condition, the device immediately trips out again, and this continues until such time as the device is wired correctly, that is, when power is applied to the GFCI at the line terminals. This effectively results in a GFCI that will not operate, i.e., be able to be reset, until such time as the device is properly wired.

In another embodiment, a fuse (F1 in FIG. 3) is placed in series with the fault resistance R10, R13. Fuse F1 has a properly selected $I^2t$ rating such that the fuse blows instead of the fault resistance R10, R13. Accordingly, the term "resistive element" as used herein refers to either a resistance or a fuse. Once the device has been properly wired by connecting AC power to the line terminals the device is reset operates normally.

Two interesting issues with this miswire protection concept are how to perform the Underwriters Laboratories Standard 943 required tests during manufacturing of the protective device without the differential current produced by the fault resistor affecting the test results, or causing the fault resistor to clear in the manner previously described.

One solution is to place a normally closed switch S1 in series with the fault resistance R10, R13 previously described as producing the differential current. This switch S1 is preferably a flexible conductive spring arm that normally rests against a contact on the top side of the printed circuit board. Directly below the spring arm of switch S1 is a hole in the printed circuit board, and below this hole is another hole in the plastic back body of the GFCI device. When the GFCI is loaded into a piece of test equipment designed to perform the required manufacturing tests, a mechanical test probe engages the spring arm of switch S1 through the two aforementioned holes, causing the spring arm of switch S1 to be pushed away from the contact and therefore opening the differential current circuit path. Manufacturing testing can now be performed without any circuit effect from this path, without burning out fault resistance R10, R13. The last test performed on the GFCI device in the test sequence is to disengage the probe from the spring arm of switch S1, which reconnects the differential current circuit path. Line voltage is then applied to the load contacts. The differential current causes the GFCI to trip, thereby checking the integrity of the differential current circuit path and components.

Another feature of the GFCI of the present invention relates to the indicator circuit that includes light element 40, and resistors R11, R12, R14. The indication device may be implemented as a neon light. Indicator 140 has multiple indication meanings. The first function of light 40 is as a trip indicator. The light is off if the GFCI is in the reset condition, and illuminates if the GFCI trips. The second function of light 40 is to indicate miswiring. A third function of light 40 is to notify the user that the GFCI is no longer operational because of a defective solenoid-driving device.

When the GFCI is wired properly such that the AC power source is connected to the line terminals and the contacts 124 are closed, there is no voltage across light 40 and resistor R12. Accordingly, light 40 is not energized. If the GFCI trips for any reason, line voltage is applied across indicator 40 and resistors R12 and R11 and light is emitted. When the device is reset, voltage is removed and light 40 is deenergized. As noted above, when the device is miswired it will continue to trip out immediately after reset. However, the user will notice that light 40 is not energized after tripping occurs. Of course, in the miswired state, there is no return path to neutral through resistor R11. Note that the wiring state detection functionality of the indicator circuit feature is not dependent on the fault resistance R10, R13. Accordingly, wiring state detection is provided by the present invention even if the miswire detection circuit has been previously used and the fault resistance cleared.

Indicating a defective solenoid driving device, such as SCR Q1, is achieved with the addition of a resistor R14. Light 40 is energized when the SCR Q1 short circuits because resistor R14 provides a path to supply neutral. When this occurs, and the device is reset, the GFCI trips, energizing light 40 through resistor R14. Continuously applied line voltage to the solenoid occurring as a result of a shorted SCR Q1 causes the trip solenoid (coil 140) to open within a few seconds. Coil 140 burns out since it is continuously energized, so it cannot trip again after the device is reset. When the GFCI is reset in this condition, light 40 remains energized, indicating a defective solenoid driving device. The value of resistor R14 must be kept low relative to the value of resistor R12 as a voltage divider occurs between resistors R12 and R14 which limits the voltage across light 40. A neon lamp needs a minimum of about 60 volts to arc over and energize. A value of 33K for resistor R14 is suitable for this embodiment, which provides for about 66 volts across the neon lamp at a worst case line voltage of 102 VAC. Computing different values for resistors R11, R12, and R14 based on different types of lights 40 is considered within the capabilities of one skilled in the art.

Yet another feature of the present invention relates to the voltage transient protection circuitry. The present invention includes a low pass filter circuit coupled in parallel with a metal-oxide varistor (MOV) across the hot line terminal and the neutral line terminal. The low pass filter includes capacitor C8 coupled in series with solenoid 140. The low pass filter circuit does what its name suggests, it filters out high frequency voltage components. Accordingly, the GFCI of the present invention is more likely to survive transient overvoltages than a GFCI without the low pass filter, or a GFCI without the low pass filter in combination with the MOV.

Figure 2:
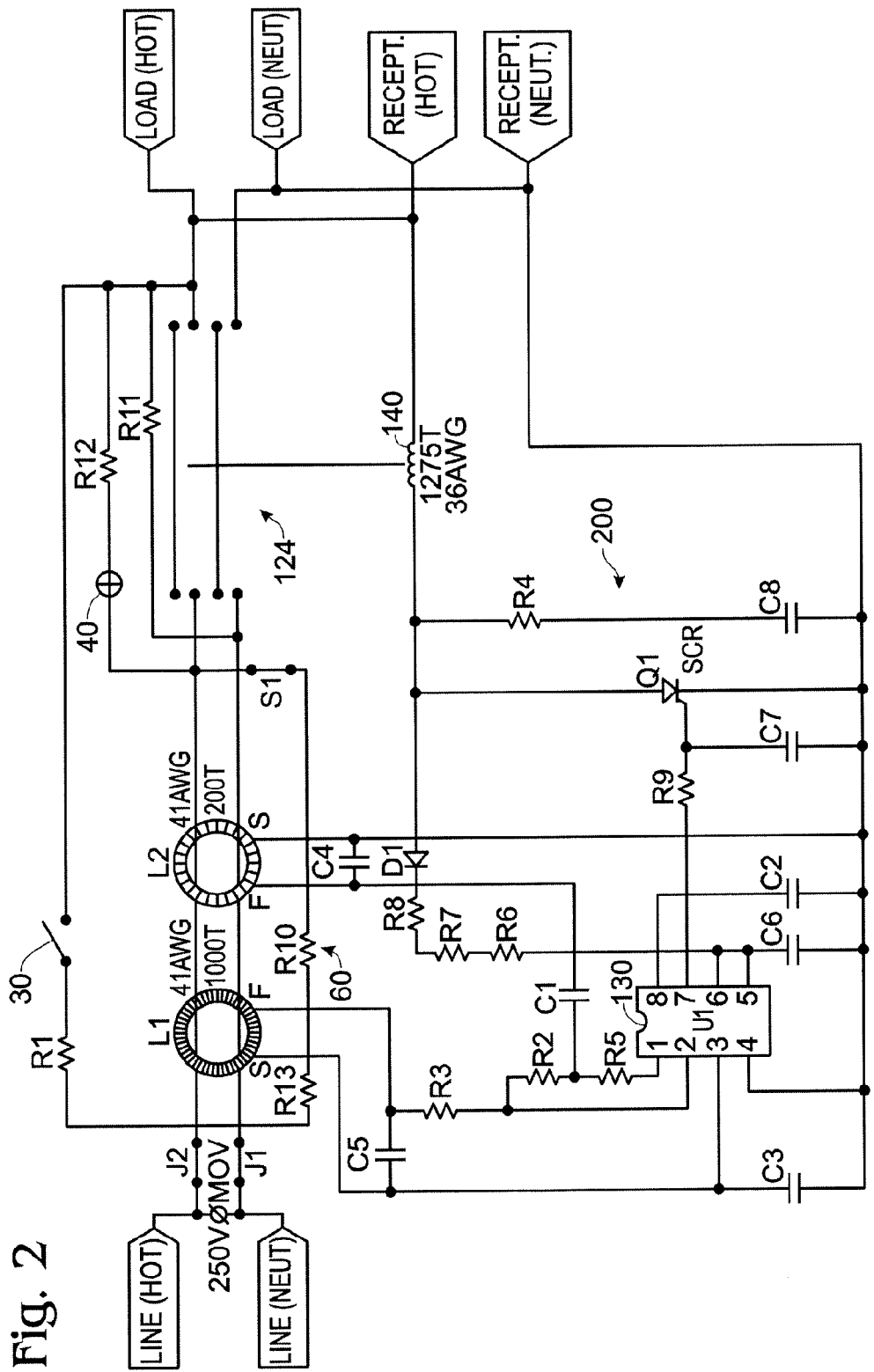
FIG. 2 shows a schematic of a lockout configuration according to an embodiment of the invention.

As embodied herein and depicted in FIG. 2, a schematic of a lockout configuration according to an embodiment of the invention is disclosed. In this embodiment of the invention, the protection device 10 cannot be rest if the SCR Q1 shorts out, i.e., the device is "locked out." This is because breaker coil 140 draws its power from the load sides of contacts 124 instead of the line side as in the embodiment of FIG. 1. When the SCR shorts out, breaker coil 140 immediately trips and opens contacts 124. Opening contacts 124 breaks the current to the load side of the device, so breaker coil 140 is de-energized, preventing it from burning out. When attempting to reset the device, breaker coil 140 immediately trips out contacts 124, thus preventing the device from being reset. Since the device cannot be reset, resistor R14 is not used in this embodiment because there is no need to indicate via light 40 that the device has a faulty SCR; the inability to reset the device signals that condition.

Figure 3:
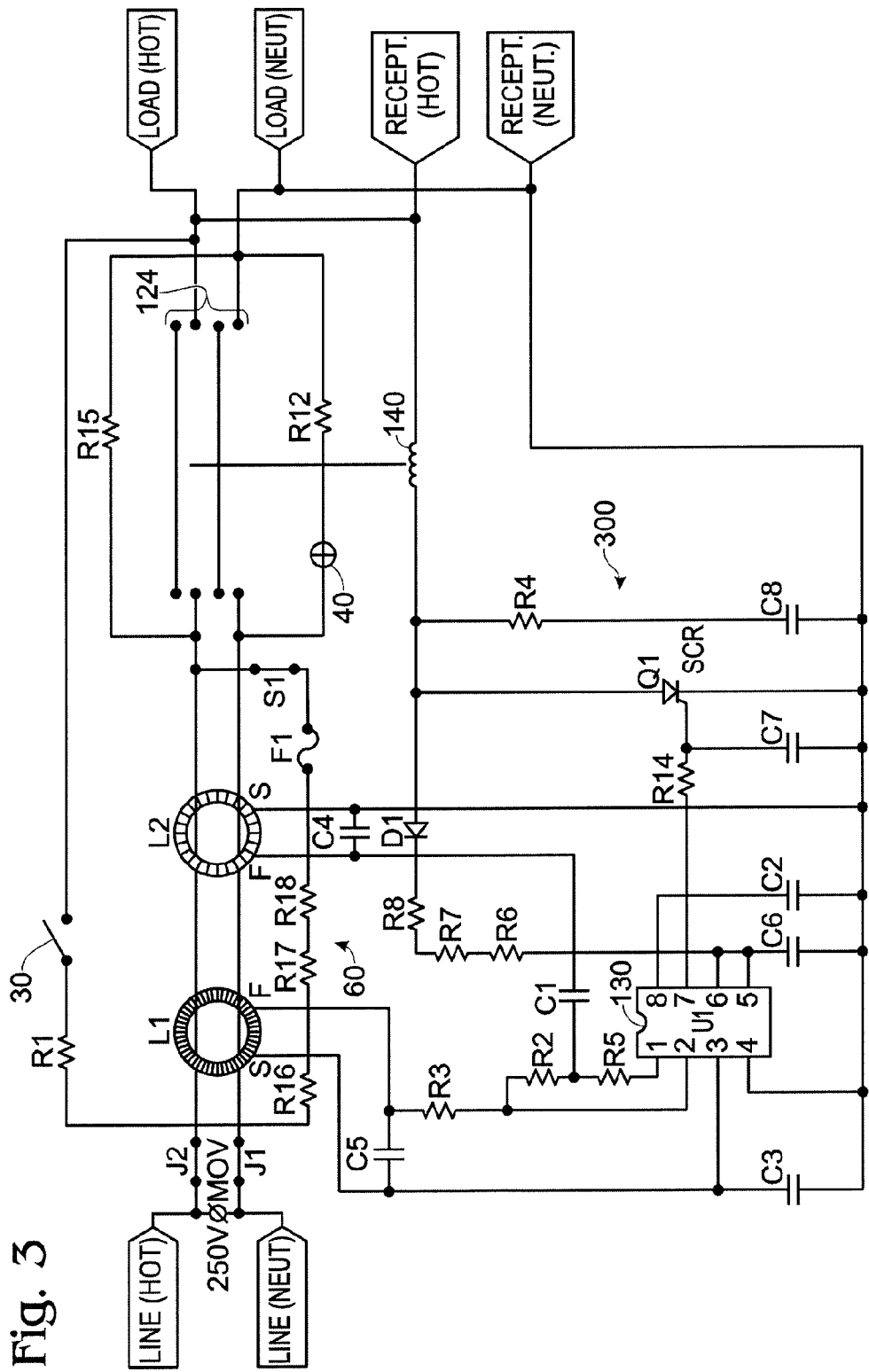
FIG. 3 shows a schematic of an alternative lockout configuration according to an embodiment of the invention.

Referring to FIG. 3, an alternative lock-out embodiment is shown at 300 which shows the series combination of light 40 and resistor R12 connected in parallel to the neutral conductor contact instead of the hot conductor contact as is the case in FIGS. 1 and 2. A resistor R15 completes the light circuit from load neutral to line hot. The miswire circuit fault resistance is shown here as resistors R16, R17, and R18 in series with fuse F1. This embodiment eliminates any trickle current that might be flowing if the device is miswired.

Figure 4:
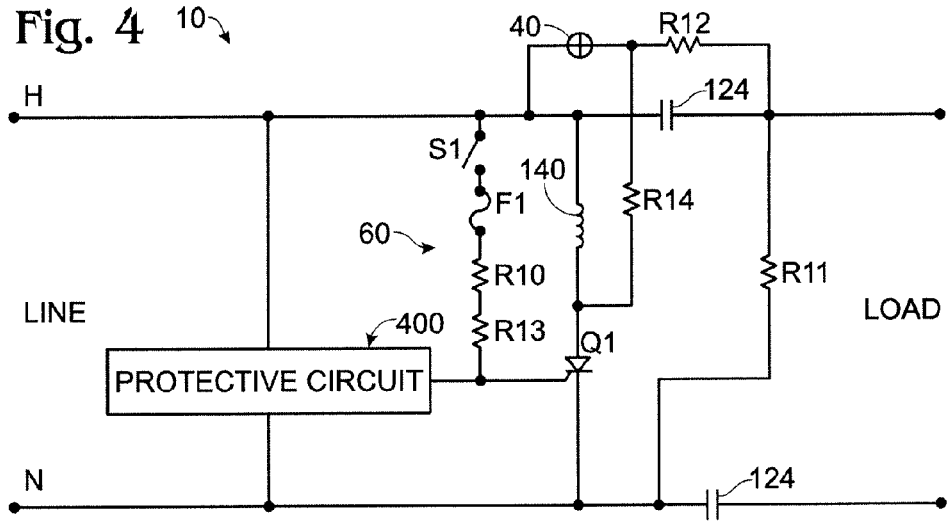
FIG. 4 shows a schematic of a protective circuit with miswire protection and an indicator lamp according to an embodiment of the invention.

Referring to FIG. 4, an embodiment of the invention is shown at 400 in which the protection device 10 can be reset if the SCR Q1 shorts out. The embodiment is similar to the one shown in FIG. 1 except that it is generalized to apply to different protective devices such as ground fault circuit interrupters (GFCI's) or devices intended to interrupt ground faults from personnel contact with a power line conductor, arc fault circuit interrupters (AFCIs) intended to interrupt line current which if allowed to continue could cause an electrical fire, combination devices that provide both AFCI and GFCI protection, or the like.

According to this embodiment, the protective devices mentioned have a protective circuit 400 that detects the respective fault condition, turning on an electronic switching device such as SCR Q1, energizing a solenoid 140 coil which receives power from the line conductors, to open interrupting contacts 124. Resistors R11, R12, R14, fault resistors R10, R13, normally closed switch S1, fuse F1, and light 40 have the same functions as previously described in the above embodiments. When power is miswired to the load terminals and the protective device is reset such that interrupting contacts 124 are closed, current flows are normally closed switch S1, fuse F1, fault resistors R10, R13 and the gate-cathode junction of SCR Q1, energizing solenoid 140 and tripping the interrupting contacts 124. Fuse F1 and fault resistors R10, R13 are chosen to withstand the current flow for the time that power is applied to the load terminals to the moment when interrupting contacts 124 open, approximately 25 milliseconds. If line power is connected as intended to the line terminals of the protective device, current flows through normally closed switch S1, fuse F1, fault resistors R10, R13, and the gate cathode junction of SCR Q1 until such time as fuse F1 clears, after which it is possible to accomplish a resetting of the interrupting contacts 124. Solenoid 140 is designed not to burn out during the interval that SCR Q1 is conductive, which interval is designed to be approximately 100 milliseconds. In this manner the protective functions described in FIG. 1 are provided without necessarily requiring a differential current transformer L1 in the construction of the protective device, or an attachment of the fault resistor and fuse circuit to both the hot and neutral line conductors. If an electronic switching device other than an SCR is used, e.g., a bipolar transistor, the connections shown here are being made to the gate of the SCR would instead be made to the base of the bipolar transistor. "Gate" and "base" are intended to have an equivalent meaning in this specification and claims.

A high voltage dielectric test requirement in the present UL Standard. This test is performed by applying a high voltage potential between line hot and load hot (and again between line neutral and load neutral) with the GFCI in the tripped condition. The light indication circuit connection between line and load hot in the previous embodiments may result in a test failure. Another potential relates to the maximum "leakage" current (Approximately 0.5 mA). The maximum allowable current may not be sufficient to drive an LED to achieve the desired light output in the indicator light.

Figure 5:
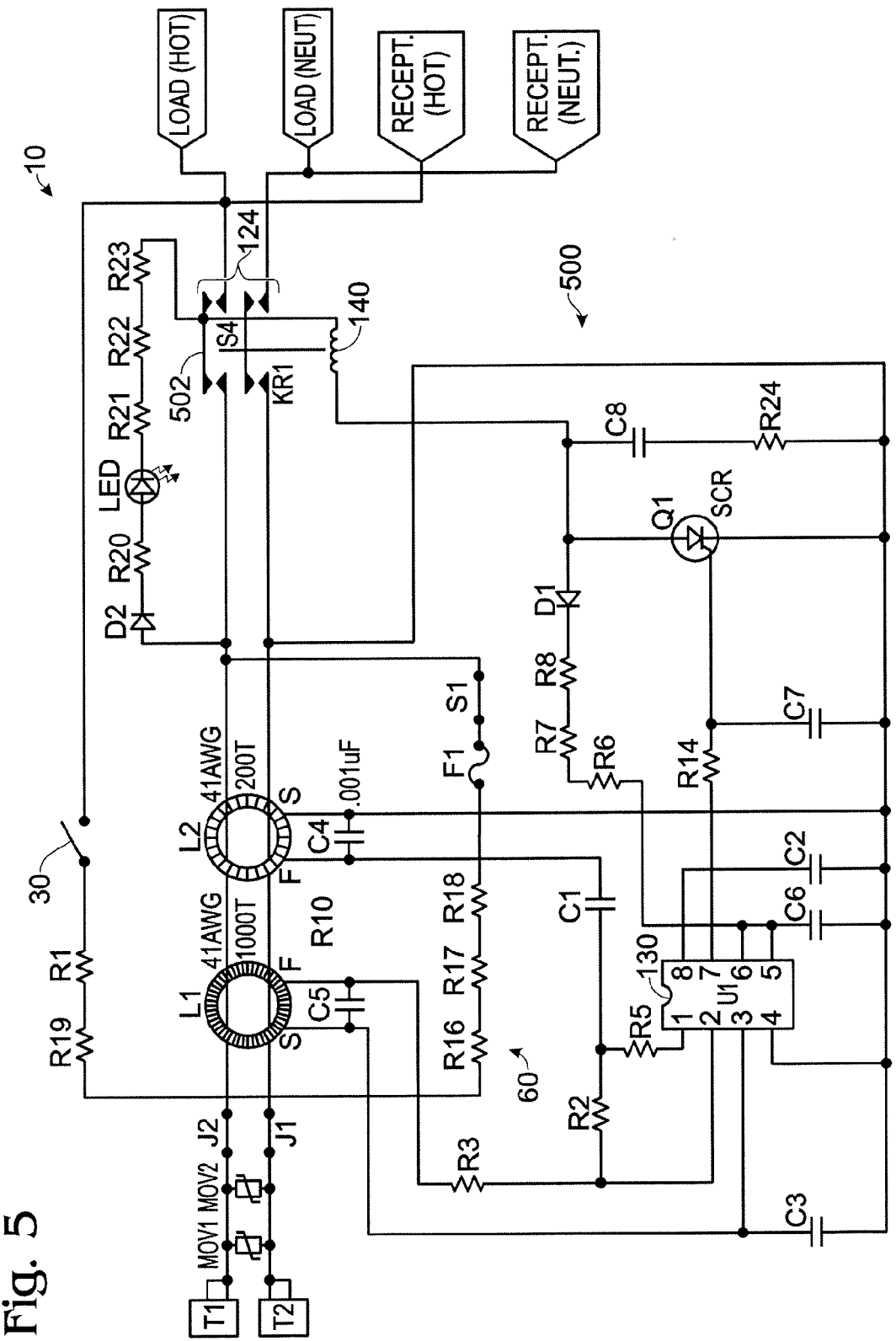
FIG. 5 shows a schematic of a protective circuit with miswire protection and an indicator lamp according to an embodiment of the invention.

Referring to FIG. 5, a circuit 500 is shown in which circuit power is derived from hot bus bar 502 of the tripping mechanism. Circuit 500 still meets the original circuit requirements of removing power to the SCR Q1 when the SCR Q1 shorts. When power is applied and the GFCI 10 is in the reset condition, bus bar 502 is in contact with the line hot, so the circuit is powered. When a ground fault is senses by differential transformer L1, the GFCI device of this embodiment trips normally.

Another function of the original circuit was to have an indicator light that came on as a result of the GFCI tripping when the GFCI was correctly wired, but when the GFCI was miswired by bringing power to the load contacts, the indicator light would not energize when the GFCI was tripped. The indicator circuit of this embodiment includes a diode D2 in series with resistors R20, R21, R22, and R23, and an LED. When the properly wired GFCI trips and the SCR Q1 is not shorted out, bus bar 502 which provides power to circuit 500 is removed from contact with line hot. Current then flows through the indicator circuit, coil 140, diode D1, and resistors R6, R7, R8 to provide the power to illuminate the LED. Nominal current through the LED is about 4 ma.

The indicator circuit works in conjunction with the GFCI sense circuitry to power the indicator and to protect coil 140 in the event that the SCR Q1 shorts out. When the properly wired GFCI trips due to the SCR shorting, current still flows through the indicator circuit, coil 140, and then through the shorted SCR Q1. Nominal current in this scenario is about 10 ma. Coil 140 is protected from burning out by the resistor chain R20, R21, R22, and R23. Diode D1 serves to half wave rectify the voltage for circuit 500, protects the LED from breaking over in the reverse direction when the GFCI is tripped, and halves the power across resistor chain R20, R21, R22, and R23 when the SCR shorts out.

When the GFCI is miswired, i.e., when the power is applied to the load terminals of the device instead of the line terminals of the device, the LED cannot light because there is no path for the current to take when the device is tripped. Thus, if the device is tripped and no light appears, the installer knows that the device is miswired. Although the invention is described with respect to a GFCI, the invention is equally applicable to an AFCI or indeed to any circuit interrupting device.

In several of the preceding embodiments the wiring state detection circuit includes two wiring state detection circuits, namely the wiring state detection circuit 60 and an indicator circuit including light 40. These two detection circuits respond differently, depending on whether the miswired condition has occurred during the first time the protective device has been installed, or during a subsequent re-installation. By way of example, if the wiring state detection circuit 60 includes a non-resettable fuse, it is only able to afford protection during the first (or a single) installation. For this example, wiring state detection circuit 60 is inoperative during subsequent reinstallation even if there is a miswire condition. However, the indicator circuit provides miswire protection for reinstallation. Thus the two circuits in combination provide miswire protection in a broader range of situations.

Figure 6:
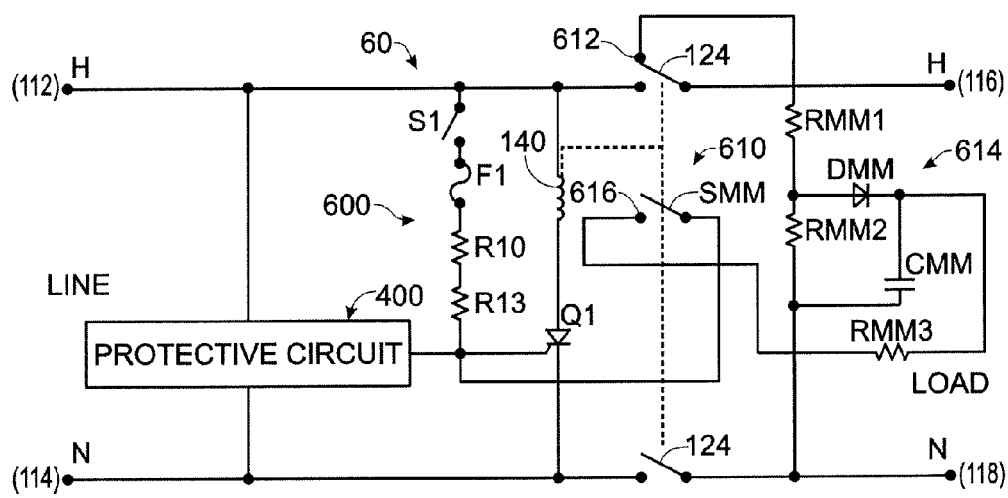
FIG. 6 shows a schematic of a protective circuit with miswire protection according to an embodiment of the invention.

As embodied herein and depicted in FIG. 6, a schematic of a protection device 10 with a wiring state detection assembly 60 according to an embodiment of the invention is shown. This embodiment is similar to the one depicted in FIG. 4. The protective circuit 400 is identical to the protective circuit depicted in FIG. 4, and may be realized using any of the protective circuit embodiments described in the instant patent disclosure and shown in FIGS. 1-17. In this embodiment, the wiring state detection assembly 60 includes two wiring state detection circuits 600, 610. The wiring state detection circuit 600 is identical to the one depicted in FIG. 4 and, therefore, the description will not be repeated for sake of brevity.

The second wiring state detection circuit 610 includes a switch contact 612 that is open when the circuit interrupter contacts 124 are closed, and closed when the circuit interrupter contacts 124 are open. Switch contact 612 is coupled to an isolation switch 616 ($S_{MM}$) that works in conjunction with the circuit interrupter contacts 124, i.e., when the circuit interrupter contacts 124 are tripped, switch 616 ($S_{MM}$) is open. Conversely, when the circuit interrupter contacts 124 are in the reset state, switch 616 ($S_{MM}$) is closed. Isolation switch 616 is connected to the input of SCR Q1 (as is wiring state detection circuit 600). Accordingly, both detection circuits (600 and 610) actuate SCR Q1 in response to detecting a miswire condition. With respect to detection circuit 610, when the isolation switch 616 is closed, SCR Q1 will be fired only when the charging circuit 614 detects a miswire condition.

Charging circuit 614 includes a resistor $R_{MM}1$ connected to the switch contact 612. Resistor $R_{MM}1$ is connected in series with resistor $R_{MM}2$, which is disposed in parallel with diode $D_{MM}$ and capacitor C. Resistor $R_{MM}3$ is connected between the cathode of the diode $D_{MM}$ and isolation switch 616. When the protection device 10 is reset and properly wired, such that a source of AC power is connected to the line terminals (112, 114), switch contact 612 is open and the charging circuit 614 is not able to charge because $R_{MM}1$ is not connected to AC power. In the tripped state, $R_{MM}1$ is also not connected to AC power because AC power is connected to the line terminals (112, 114) and the load terminals (116, 118), of course, are not powered.

If protection device 10 is miswired and tripped, $R_{MM}1$ is connected to AC power via the switch contact 612 and load hot terminal 116. Resistor $R_{MM}3$ is open circuited by virtue of isolation switch 616 being open. Thus, capacitor $C_{MM}$ charges when the device 10 is miswired and tripped. When the user resets device 10, capacitor $C_{MM}$ discharges through the closed isolation switch 616 and actuating the control input of SCR Q1 to turn it ON. When SCR Q1 is ON, solenoid 140 is energized, the interrupting contacts 124 trip, and the charging of capacitor $C_{MM}$ begins anew.

Figure 7:
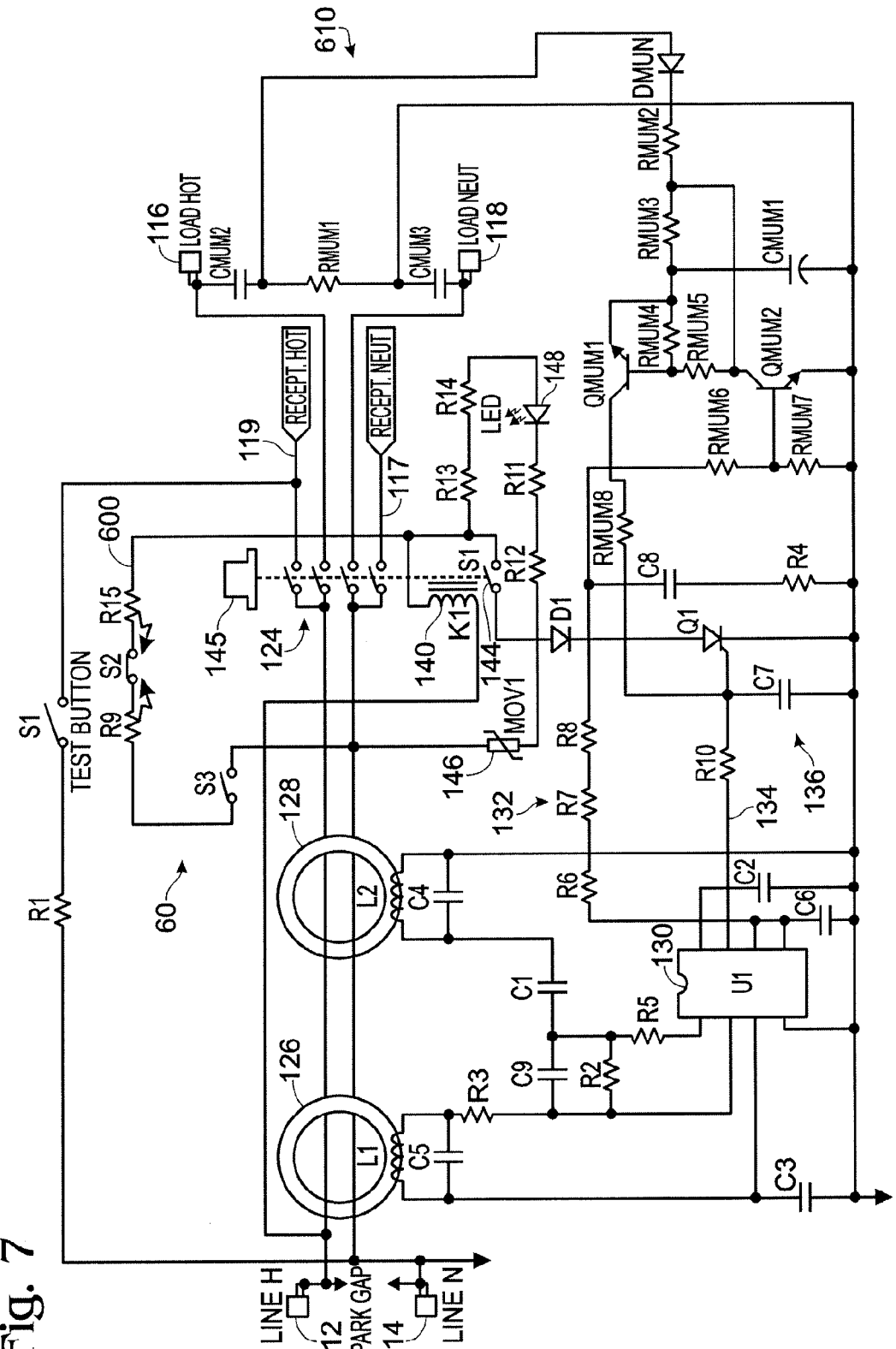
FIG. 7 shows a schematic of a protective circuit with miswire protection according to an embodiment of the invention.

As embodied herein, and depicted in FIG. 7, a schematic of a circuit protection device 10 in accordance with an embodiment of the present invention is disclosed. Device 10 includes line terminals 112, 114, load terminals 116, 118, and receptacle terminals 117, 119. Load terminals 116, 118 may also be referred to as feed-through terminals. As noted above, these terminals may be connected to wiring configured to provide power to downstream receptacles or switches. Receptacle load terminals 117,119 are configured to mate with one or more electrical plugs to provide power to a corded appliance or other such electrical loads. The line terminals 112, 114 are electrically connected to both load terminals 116, 118 and receptacle terminals 117,119 when circuit interrupter 124 is reset. When in the tripped state, the circuit interrupter 124 disconnects the load terminals from the line terminals. In addition, the circuit interrupter 124 may independently disconnect at least one feed-through terminal from a corresponding receptacle terminal.

The ground fault circuitry includes a differential transformer 126 which is configured to sense load-side ground faults. Transformer 128 is configured as a grounded neutral transmitter and is employed to sense grounded-neutral fault conditions. Both differential transformer 126 and grounded-neutral transformer 128 are coupled to detector circuit 130. Power supply 132 provides power for GFI detector circuit 130. Detector 130 provides an output signal on output pin 134 based on the transformer outputs. The detector output signal is filtered by circuit 136. The filtered output signal is provided to the control input of SCR Q1. When SCR Q1 is turned ON, solenoid 140 is energized to trip the circuit interrupter 124 and remove the fault condition. When this happens, the signal at the control input of the SCR Q1 turned OFF. The time that the solenoid 140 remains energized is less than about 25 milliseconds. After the fault condition has been eliminated, circuit interrupter 124 may be reset by way of reset button 145.

Although FIG. 7 has disclosed a ground fault circuit interrupter (GFCI) circuit, those of ordinary skill in the art will understand that the present invention should not be construed as being limited to GFCIs. The present invention is suitable for use in other types of protective devices. For example, the sensor in an AFCI is similar to transformer 126 but is typically configured to sense load current by way of a toroidal transformer or a shunt and/or line voltage by way of a voltage divider. The detector in an AFCI is similar to detector 130 but is configured to detect an arc fault condition on the basis of frequency spectra or high frequency noise bursts. Once an arc fault condition is detected, a signal is sent in a similar manner to an SCR which in turn activates a trip mechanism to trip the circuit interrupter. Thus the spirit of the invention disclosed herein applies to GFCIs and to protective devices in general.

The present invention addresses certain end of life conditions by denying power to the load terminals when the protective device is unable to function. One end of life condition may cause the solenoid to be energized when a fault condition is not present, or if the circuit interrupter is in a tripped state. The solenoid is susceptible to burn-out if it is permanently ON. One way that this can happen is if SCR 138 is permanently ON. Another way is if SCR 138 has shorted out. Note that most solenoids are configured to be energized only momentarily and burn out if energized for more than about 1 second. Once the solenoid burns out, the circuit interrupter is incapable of being tripped. As a result, the load terminals are permanently connected to the line terminals even when there is a fault condition. Solenoid burn-out may be prevented by an auxiliary switch 144. Auxiliary switch 144 is configured to open when circuit interrupter 124 is in the tripped position. If SCR 38 is shorted, or is permanently ON, auxiliary switch 144 ensures that solenoid 140 is not permanently connected to a current source. For example, if reset button 145 is activated, circuit interrupter 124 resets but immediately trips in response to the trip mechanism 142, which in turn moves auxiliary switch 144 to the open position before solenoid 140 is able to burn out. This sequence will repeat ad infinitum.

The auxiliary switch 144 affords other electrical benefits. Those of ordinary skill in the art will understand that a metal oxide varistor (MOV) is frequently employed in protective devices to protect the electrical circuit from voltage surges that sometimes occur in the electrical distribution system. The end-of-life failure mode of a MOV is typically an electrical short. The resulting current can be enough to thermally damage the enclosure of the protective device. Therefore, in one embodiment of the present invention, MOV 146 is connected in series with auxiliary switch 144 and trip solenoid 140 to eliminate any over-current situation. Thus, when MOV 146 reaches end of life and shorts out, trip solenoid 140 is energized to open auxiliary switch 140 and the flow of short circuit current is terminated before any damage ensues.

Another beneficial feature of the present invention is provided by disposing indicator 148 in parallel with auxiliary switch 144. In this embodiment, indicator 148 is implemented as a trip indicator, emitting a visual and/or audible indicator signal when circuit interrupter 124 is in the tripped state, i.e., when the auxiliary switch 144 is open. Of course, indicator 148 provides no such signal when device 10 is in a reset state. Again, indicator 148 may include visual indication, audible indication or both. The indicator may also be configured to emit a repetitive signal (flashing or beeping). A visual indicator may be a flashing red indicator.

Like the embodiment depicted in FIG. 6, the embodiment shown in FIG. 7 includes a wiring state detection assembly 60 that has two wiring state detection circuits 600, 610. The wiring state detection circuit 600 depicted in FIG. 7 is identical, or very similar to the wiring state detection circuits depicted in FIGS. 1, 2, 3, and 5. These wiring state detection circuits have been described above in much detail, and therefore, an further description is unnecessary. Like the wiring state detection circuits depicted in FIG. 4 and FIG. 6, the secondary wiring state detection circuit 610 is also coupled to the control input to SCR Q1. Before describing wiring state detection circuit 610 in detail, one should note that SCR Q1 may be turned ON to trip device 10 for four (4) reasons: (1) a fault condition is sensed by sensor 126, detected by detector 130 and a signal is transmitted via resistor R10 to SCR Q1; (2) a simulated fault is generated by the test button, sensed by sensor 126, detected by detector 130 and a signal is transmitted via resistor R10 to SCR Q1; (3) a wiring state detection signal is generated by circuit 600, sensed by sensor 126, detected by detector 130 and a signal is transmitted via resistor R10 to SCR Q1; and (4) a miswire signal is generated by detection circuit 610 and transmitted to SCR Q1 via resistor $R_{MUM}8$.

Wiring state detection circuit 610 includes an isolation circuit, a detection circuit and a firing circuit. With respect to the isolation circuit, the load hot 116 is connected to dielectric isolation capacitor $C_{MUM}2$ and the load neutral is connected to dielectric isolation capacitor $C_{MUM}3$. Resistor $R_{MUM}1$ is disposed between capacitor $C_{MUM}2$ and capacitor $C_{MUM}3$. The purpose of this portion of circuit 610 is to ensure that the line and load terminals are isolated from each other.

The detection portion of the circuit includes capacitor $C_{MUM}1$, diode $D_{MUM}$, various resistors, and a proper wiring detection transistor $Q_{MUM}2$. Transistor $Q_{MUM}2$ is coupled to the power supply 132 by way of the voltage divider circuit comprising resistor $R_{MUM}6$ and resistor $R_{MUM}7$. The base drive for transistor $Q_{MUM}2$ is, of course, provided by the output of the voltage divider. When the device is properly wired, the base drive of the transistor $Q_{MUM}2$ is provided in the manner described above and collector-emitter current is provided by diode $D_{MUM}$ via resistor $R_{MUM}2$. Transistor $Q_{MUM}2$ is referred to herein as a proper wiring detector because it is ON by virtue of the power supply 132, which is coupled to line hot, and because it prevents miswire detection capacitor $C_{MUM}1$ from accumulating charge. If the device 10 is tripped when properly wired, wiring state detection circuit 610 is not powered. Upon reset, however, the base drive of the transistor $Q_{MUM}2$ is reenergized, and the collector-emitter current begins to flow in the manner described above.

If device 10 is miswired and tripped, transistor $Q_{MUM}2$ is turned OFF because the line side (and hence power supply 132) is deenergized. On the other hand, power is being applied to diode $D_{MUM}$ from the load terminals 116, 118. As such, capacitor $C_{MUM}1$ begins to accumulate charge via resistor $R_{MUM}2$ and resistor $R_{MUM}3$. Once device 10 is reset, transistor $Q_{MUM}2$ is turned ON because the power supply 132 is reenergized. However, in this instance, because of the accumulated charge, there is sufficient voltage drop on $R_{MUM}4$ such that firing transistor $Q_{MUM}1$ is turned ON triggering SCR Q1. As described above, once SCR Q1 is turned ON, solenoid 140 is energized and the circuit interrupting contacts 124 are tripped.

Figure 8:
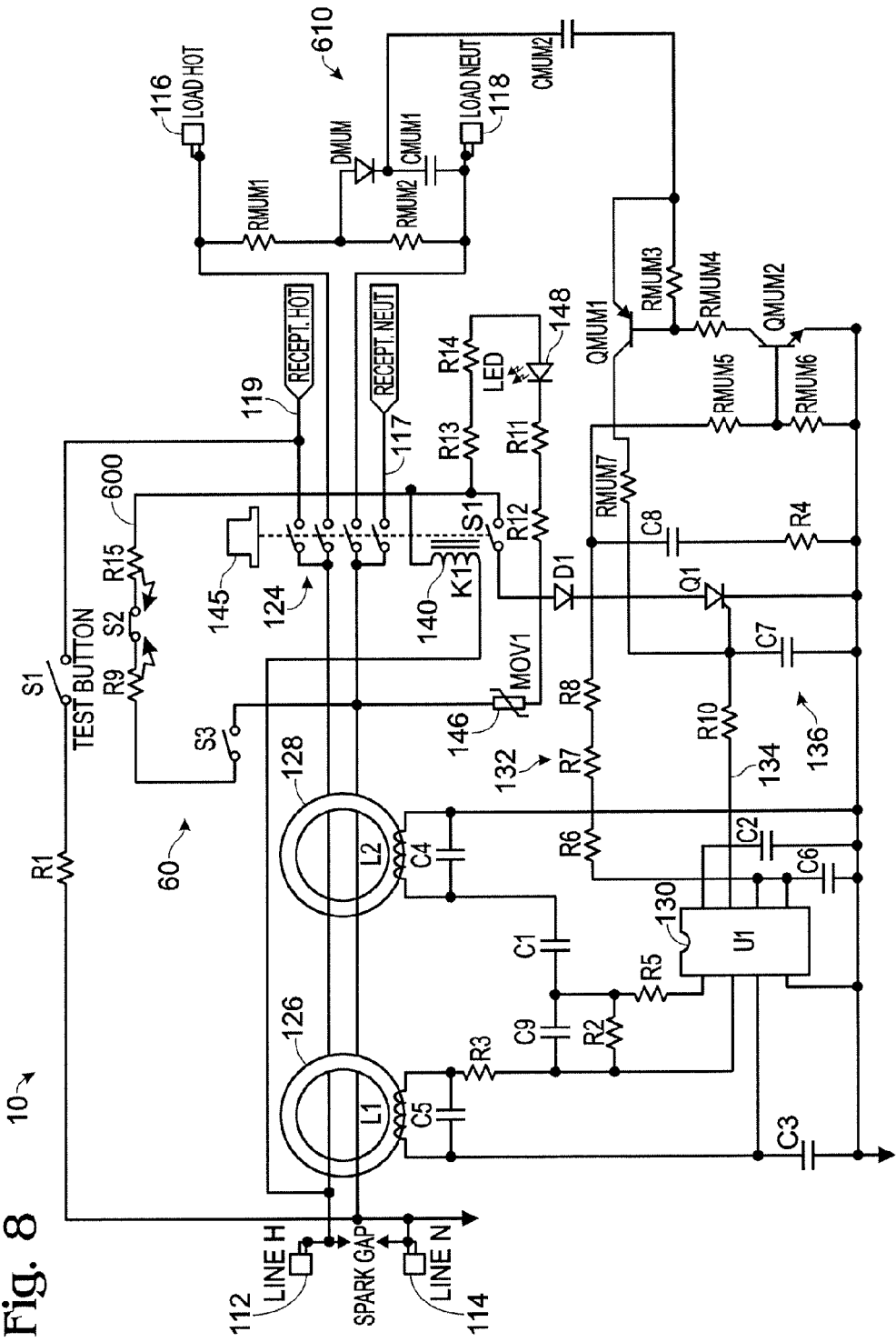
FIG. 8 shows a schematic of a protective circuit with miswire protection according to an embodiment of the invention.

As embodied herein and depicted in FIG. 8, a schematic of a protective circuit 10 with wiring state protection according to an embodiment of the invention is disclosed. The ground fault circuitry in FIG. 8 is identical to the circuitry shown in FIG. 7, and therefore, any further description is redundant.

Device 10 includes a wiring state protection assembly 60 that includes wiring state protection circuit 600 and secondary wiring state protection circuit 610. Again, the wiring state detection circuit 610 includes an isolation circuit, a detection circuit and a firing circuit.

With respect to the isolation circuit, the load hot 116 is connected to resistor $R_{MUM}1$, resistor $R_{MUM}1$ is connected to resistor $R_{MUM}2$, and resistor $R_{MUM}2$ is connected to load neutral. Diode $D_{MUM}$ is connected to resistor $R_{MUM}1$ and resistor $R_{MUM}2$ at the node where these two resistors are connected. The cathode of diode $D_{MUM}$ is connected to capacitor $C_{MUM}1$, which is also connected to load neutral. The purpose of this portion of circuit 610 is to ensure that the line and load terminals are isolated from each other.

With respect to the detection portion of the circuit, the cathode of diode $D_{MUM}$ and capacitor $C_{MUM}1$ are connected to charging capacitor $C_{MUM}2$, which is coupled to proper wiring detection transistor $Q_{MUM}2$ and SCR trigger transistor $Q_{MUM}1$. Like the embodiment shown in FIG. 7, transistor $Q_{MUM}2$ is coupled to the power supply 132 by way of the voltage divider circuit comprising resistor $R_{MUM}5$ and resistor $R_{MUM}6$. The output of the voltage divider is connected to the base of transistor $Q_{MUM}2$. Transistor $Q_{MUM}2$ is ON and collector-emitter current flows when the device 10 is properly wired and in the reset state. It prevents miswire detection capacitor $C_{MUM}2$ from accumulating charge and turning SCR trigger transistor $Q_{MUM}1$ ON when the device 10 is properly wired.

The firing circuit, of course, includes SCR trigger transistor $Q_{MUM}1$, charging capacitor $C_{MUM}2$, and several resistors as depicted in FIG. 8. Charging capacitor $C_{MUM}2$ accumulates charge from diode $D_{MUM}$ via resistor $R_{MUM}1$ and/or from capacitor $C_{MUM}1$ depending on the polarity of the AC signal.

When device 10 is properly wired, in the reset state and then power is applied to the line terminals (112, 114), the amount of charge accumulated by capacitor $C_{MUM}2$ is not sufficient to turn SCR trigger transistor $Q_{MUM}1$ ON. This is because there is not enough base-emitter current flowing through transistor $Q_{MUM}2$. When the device 10 is miswired and power is applied to the load terminals (116, 118), charge accumulates on capacitor $C_{MUM}1$. If the circuit interrupter is in the tripped state, $C_{MUM}2$ cannot charge concurrently due to the fact that $Q_{MUM}2$ is OFF. When the device 10 is reset, the base of the transistor $Q_{MUM}2$ is provided power from power supply 132 via the voltage divider. As a result, $Q_{MUM}2$ turns ON and $C_{MUM}2$ starts charging abruptly. There is sufficient charging current such that SCR trigger transistor $Q_{MUM}1$ is turned ON. Since the collector of transistor $Q_{MUM}1$ is connected to the control input of SCR Q1, SCR Q1 also turns ON. As a result, the solenoid 140 is energized and the circuit interrupting contacts 124 are tripped.

Figure 9:
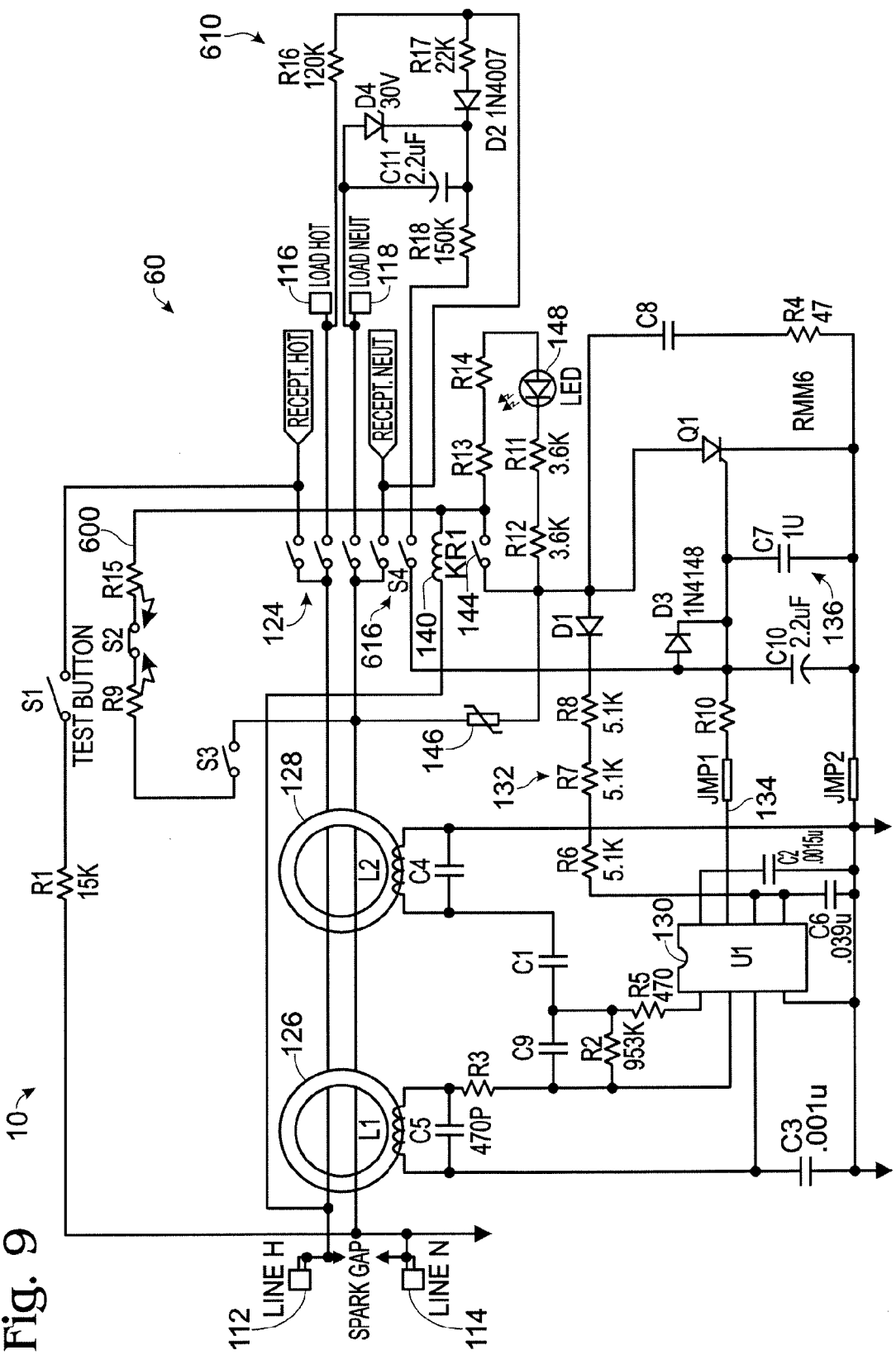
FIG. 9 shows a schematic of a protective circuit with miswire protection according to an embodiment of the invention.

As embodied herein and depicted in FIG. 9, a schematic of a protective circuit 10 with wiring state protection according to another embodiment of the invention is disclosed. The ground fault circuitry in FIG. 9 is identical to the circuitry shown in FIG. 7 and FIG. 8, and therefore, any further description is redundant. However, like some of the previous embodiments, device 10 includes a wiring state protection assembly 60 that includes wiring state protection circuit 600 and secondary wiring state protection circuit 610.

In this embodiment, dielectric isolation is provided by switch 616 (S4) which operates in conjunction with the circuit interrupter contacts 124. Load hot terminal 116 is connected to resistor R16, which is in turn, connected to the receptacle neutral terminal and switch 616 via resistor R17 and diode D2. Load neutral terminal 118 is connected to capacitor C11 and zener diode D4, which are disposed in parallel and connected to the cathode of diode D4 at a node connected to resistor R18. Resistor R18 is connected in series with switch 616. Switch 616 is connected to capacitor C10. Capacitors C10 and C11 are connected to the control input of SCR Q1 by way of diode D3. Diode D3 is provided to ensure that the wiring state detection circuit 616 does not interfere with the GFCI fault detection circuitry's ability to communicate a trip detection signal to the control input of SCR Q1 in the event of a detected fault. Wiring state detection circuit 610 operates as follows.

When the device 10 is properly wired, power is applied to the line terminals and the device 10 is reset, detection circuit 610 is inoperative because the load neutral terminal and the receptacle neutral terminal are shorted together by operation of the circuit interrupter contacts 124. Thus, capacitor C11 cannot accumulate charge.

When the device 10 is miswired, in the tripped state and AC power is applied to the load terminals capacitor C11 accumulates charge via resistors R16, R17. Zener diode D4 merely clamps the voltage on C11 to protect it against overvoltage. When a user attempts to effect reset by depressing the reset button 145 (not shown in FIG. 9), the circuit interrupter 124 closes as does isolation switch 616. When isolation switch 616 is closed there is a current path between capacitor C11 and the control input of SCR Q1. Capacitor C10 filters the trip signal to ensure that the trigger pulse from C11 has sufficient duration to effect tripping. Again, once the control input of SCR Q1 is signaled, the solenoid 140 causes the circuit interrupters to trip.

Figure 10:
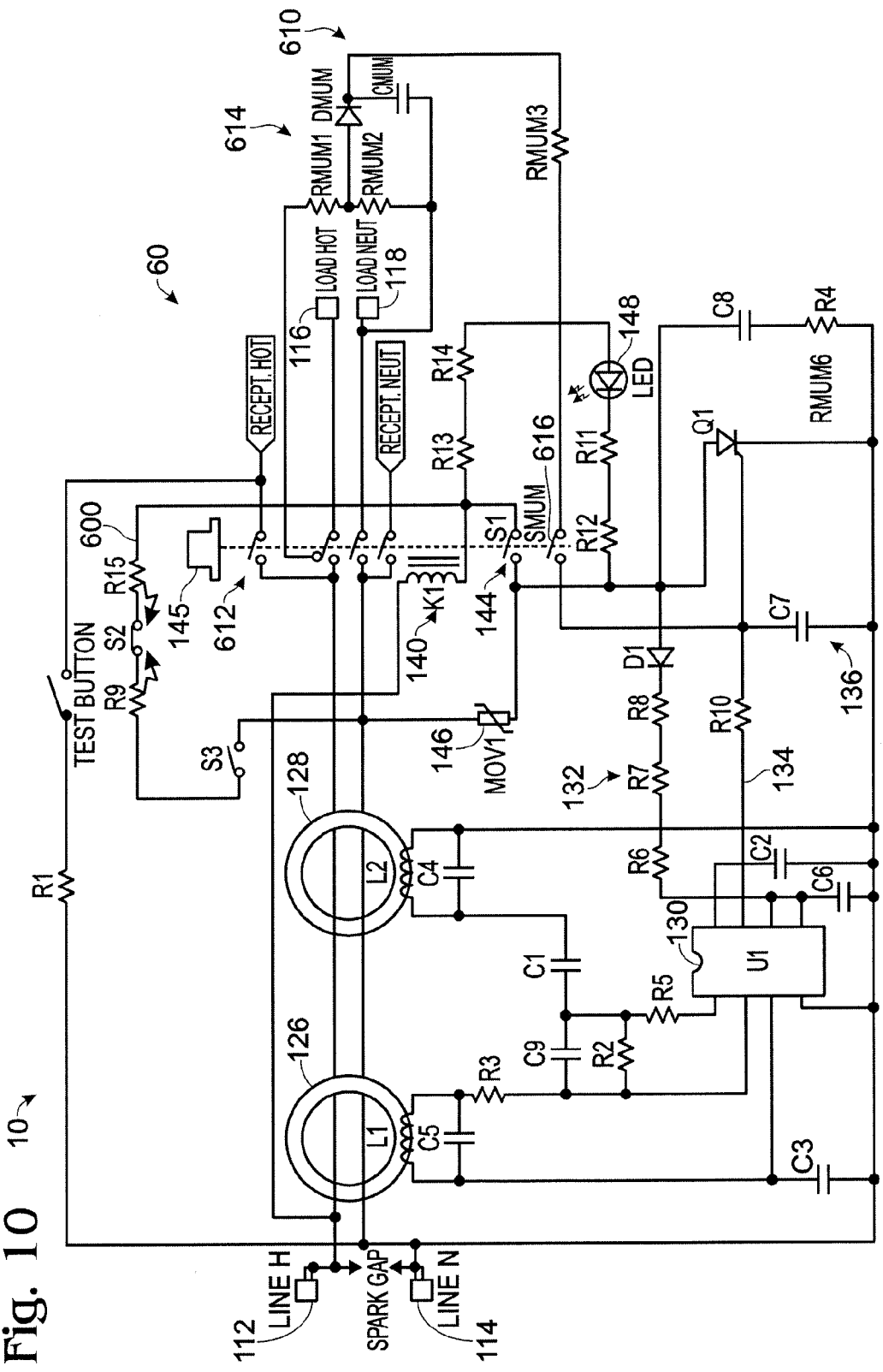
FIG. 10 shows a schematic of a protective circuit with miswire protection according to an embodiment of the invention.

As embodied herein and depicted in FIG. 10, a schematic of a protective circuit 10 with wiring state protection according to another embodiment of the invention is disclosed. The ground fault circuitry in FIG. 10 is identical to the circuitry shown in FIGS. 7-9, and therefore, any further description is redundant. However, like some of the previous embodiments, device 10 includes a wiring state protection assembly 60 that includes wiring state protection circuit 600 and secondary wiring state protection circuit 610. Wiring state protection circuit 600 is similar to the circuits employed in FIGS. 1-9, and therefore, a description of this circuit is eliminated for sake of brevity.

The secondary wiring state detection circuit 610 includes an isolation switch 612 that is open when the circuit interrupter contacts 124 are closed, and closed when the circuit interrupter contacts 124 are open. Switch 612 is coupled to an isolation switch 616 ($S_{MUM}$) that works in conjunction with the circuit interrupter contacts 124. In other words, when the circuit interrupter contacts 124 are tripped, switch 616 ($S_{MUM}$) is open and when the circuit interrupter contacts 124 are in the reset state, switch 616 ($S_{MUM}$) is closed. Both the fault detection circuit 130 and isolation switch 616 are connected to the input of SCR Q1. Accordingly, detection circuit 610 actuates SCR Q1 in response to detecting a miswire condition.

Charging circuit 614 includes a resistor $R_{MUM}1$ connected to the switch contact 612. Resistor $R_{MUM}1$ is connected in series with resistor $R_{MUM}2$, which is disposed in parallel with diode $D_{MUM}$ and capacitor $C_{MUM}$. Resistor $R_{MUM}3$ is connected between the cathode of the diode $D_{MUM}$ and isolation switch 616. When the device 10 is reset and properly wired, such that a source of AC power is connected to the line terminals (112, 114), switch contact 612 is open and the charging circuit 614 is not able to charge because $R_{MUM}1$ is not connected to AC power. In the tripped state, $R_{MUM}1$ is also not connected to AC power because AC power is connected to the line terminals (112, 114) and the load terminals (116, 118), of course, are not powered.

If device 10 is miswired, in the tripped state and AC power is applied to the load terminals (116, 118), $R_{MUM}1$ is connected to AC power via the switch contact 612 and load hot terminal 116. Resistor $R_{MUM}3$ is open circuited by virtue of isolation switch 616 being open. Since the charge on capacitor $C_{MUM}$ is not bled by $R_{MUM}3$ it accumulates charge. When the user resets device 10, capacitor $C_{MUM}$ discharges through the closed isolation switch 616, actuating the control input of SCR Q1 to turn it ON. When SCR Q1 is ON, solenoid 140 is energized, the interrupting contacts 124 trip, and the charging of capacitor $C_{MUM}$ begins anew. The circuit interrupter 124 trips each time reset is attempted until either power is removed from the load terminals or the miswiring condition is corrected.

Figure 11:
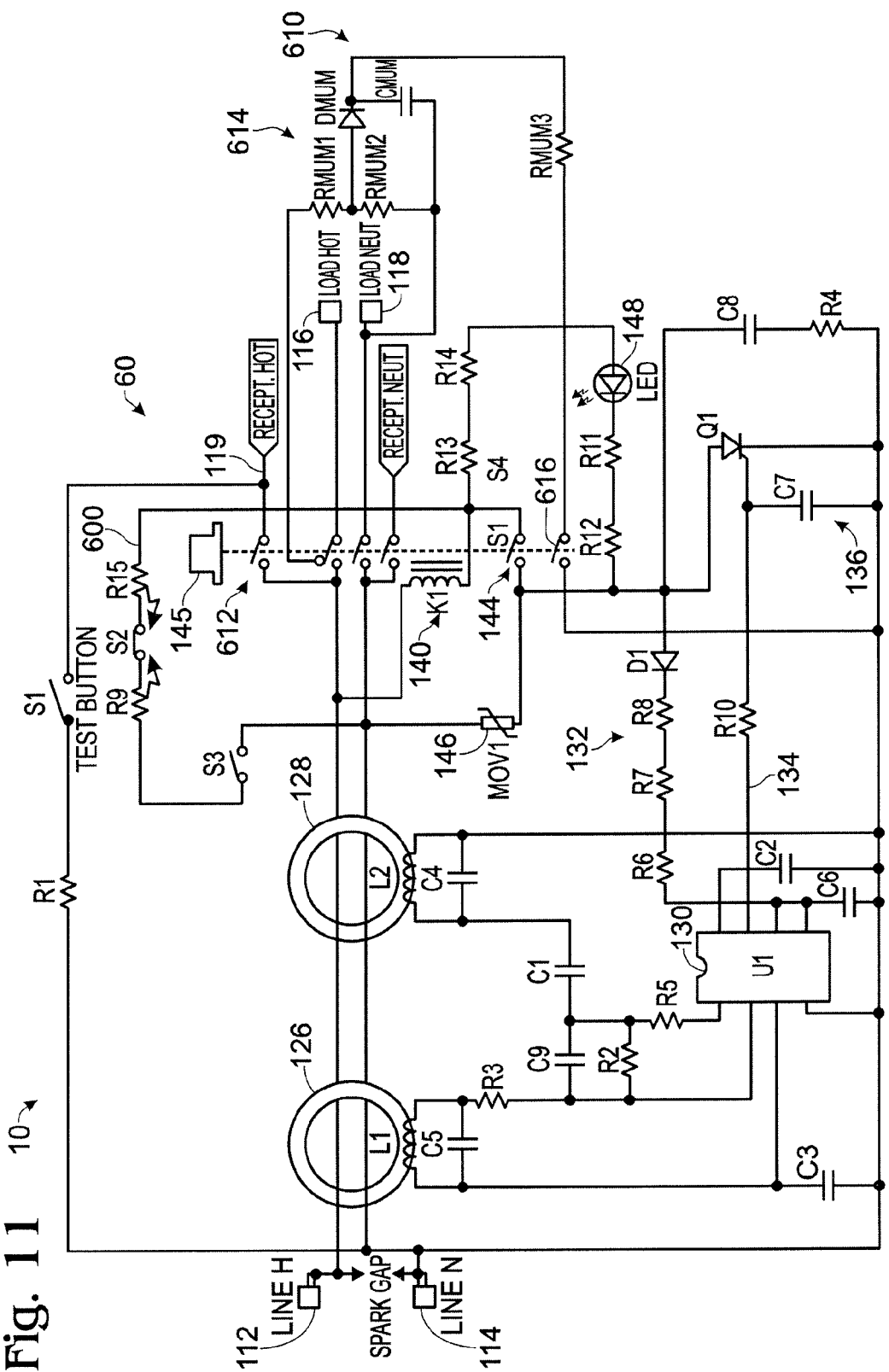
FIG. 11 shows a schematic of a protective circuit with miswire protection according to an embodiment of the invention.

Referring to FIG. 11, a schematic of a protective circuit 10 with wiring state protection according to another embodiment of the invention is disclosed. The circuit depicted in FIG. 11 is very similar to the one shown in FIG. 10. In this embodiment, the isolation switch 616 is connected to line neutral instead of the control input of SCR Q1.

When the device is properly wired and in the reset state, switch 612 is open and the detection circuit is decoupled from the hot side of the AC circuit. When the device is properly wired and tripped, the circuit is decoupled from the neutral side of the AC circuit. In both instances, therefore, the detection circuit 610 is inoperative.

When the device is miswired and in the tripped state, AC power is applied to the load terminals (116, 118). Capacitor $C_{MUM}$ accumulates charge. When the user resets device 10, capacitor $C_{MUM}$ discharges through the closed isolation switch 616 and a current is introduced into line neutral to create a differential current. The differential current is sensed by toroidal transformer 126 and detected by circuit 130. Detector circuit 130, of course, provides a trip signal to the control input of SCR Q1 and ultimately, the circuit interrupters 124 are tripped.

Note also that solenoid 140 is connected to hot line terminal 112 on the line side of differential transformer 126 instead to the load side. As such, any leakage current conducting through MOV 146 during an end of life condition is sensed by differential transformer 126 in the manner of a simulated ground fault. If the leakage current is greater than about 6 mA, detector 130 provides a signal to SCR 138 to trip circuit interrupter 124. By comparison, MOV 146 as connected in FIG. 11 requires the leakage to advance to at least 100 mA to trip the circuit interrupter.

Figure 12:
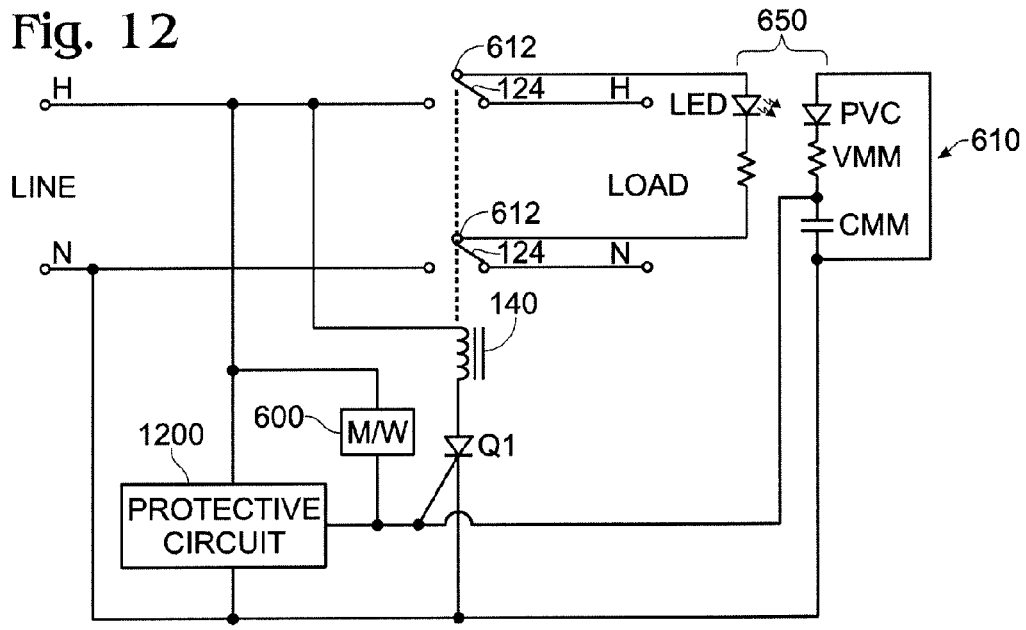
FIG. 12 shows a schematic of a protective circuit with miswire protection according to an embodiment of the invention.

As embodied herein and depicted in FIG. 12, a simplified block diagram of a protection device 10 with wiring state protection according to yet another embodiment of the invention is disclosed. The protective circuit 1200 may be implemented in accordance with any of the previous embodiments disclosed herein. Once again, device 10 includes a wiring state protection assembly 60 that includes wiring state protection circuit 600 and secondary wiring state protection circuit 610. The wiring state detection circuit 600 is identical, or similar to, the wiring state detection circuit 600 depicted in FIG. 4 or 6.

Wiring state detection circuit 610 includes an electro-optical assembly 650 that is configured to isolate the line terminals from the load terminals in the tripped state in accordance with the requirements of UL 943. Electro-optical assembly 650 includes a light emitting diode LED that is connected to the load side of the interrupting contacts 124 and a photovoltaic cell (PVC) that is connected to the line side of the circuit interrupters 124. The LED is configured such that it is illuminated only when the protective device is miswired and in the tripped condition. The light emitted from the LED is directed onto PVC which is configured to generate a voltage. Capacitor $C_{MM}$ is configured to accumulate a charge derived from the generated voltage. When the device is miswired and the circuit interrupters 124 are reset, the line side of the circuit is energized and capacitor $C_{MM}$ sends a signal to trigger SCR Q1. In response, solenoid 140 energizes and the circuit interrupters 124 are tripped. The circuit interrupters 124 trip each time reset is attempted until either power is removed from the load terminals or the miswiring condition is corrected.

When the protective device 10 is properly wired, the LED does not provide illumination and capacitor $C_{MM}$ does not accumulate a charge. As a result, wiring state detection circuit 610 does not cause nuisance tripping when the protective device 10 is properly wired.

Figure 13:
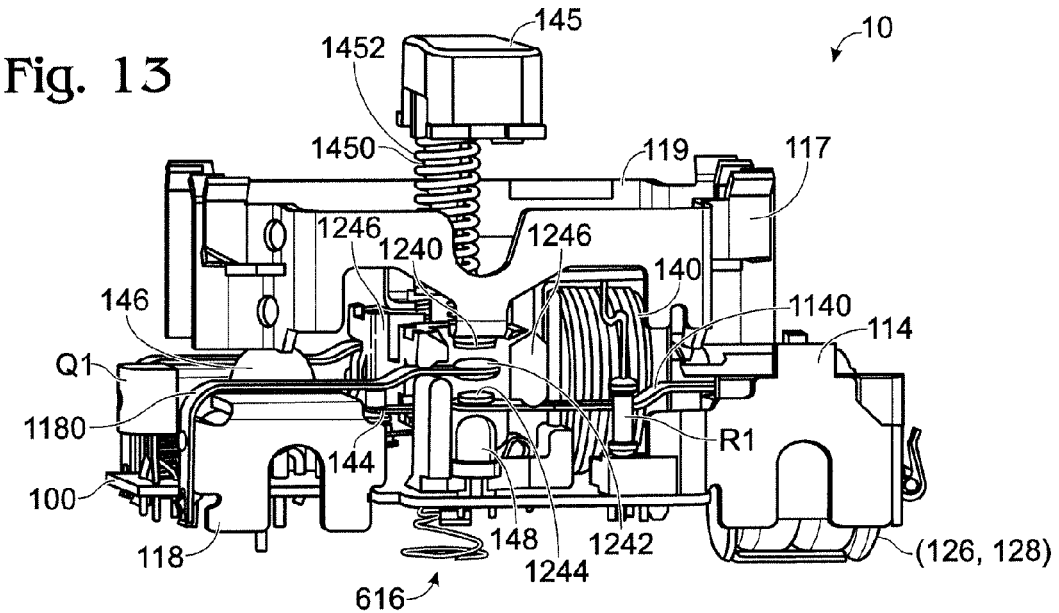
FIG. 13 is a side perspective view of a protective device in accordance with any of the embodiments depicted in FIGS. 6-12.

Referring to FIGS. 13-17, a mechanical implementation of those embodiments that employ isolation switch 616 are disclosed. FIG. 13 is a side perspective view of protective device 10 with the cover, separator and back body member removed. From right to left, line neutral terminal 114 is disposed to the exterior of the toroidal sensor assembly (126, 128). Note that the toroids (126, 128) and the solenoid 140 are disposed in the right half portion of device 10. Reset button 145 is disposed in a central location and includes a pin 1450 that extends through the latch block 1246 to engage the latch 1250 (not shown in this view) to effect reset. The armature in solenoid 140 (not shown) disengages latch 1250 to effect the tripped state. The view depicted in FIG. 13 shows the tripped state because the circuit interrupter contacts 124 (i.e., line neutral contact 1244, the load neutral contact 1242 and the neutral receptacle contact 1240) are separated. Obviously, in the reset state, the reset button assembly 145 engages the latch 1250 and the latch block closes the circuit interrupter contacts 124.

In this embodiment of the invention, the circuit interrupter 124 is implemented using a sandwiched cantilever design. The line neutral terminal 114 is connected to line neutral cantilever 1140 which includes line neutral contact 1244 disposed thereon. The load neutral terminal 118 is connected to load neutral cantilever 1180 which includes load neutral contact 1242 disposed thereon. The fixed neutral receptacle contact 1240 is disposed on the underside of neutral receptacle terminal 117. The hot receptacle terminal 119 is shown opposite the neutral receptacle terminal 117 on the far side of the reset button 145. A portion of the auxiliary contacts 144 are shown adjacent the latch block 1246.

The interior space of device 10 to the left of latch block 1246 is relatively empty above the circuit board 100. In this embodiment, SCR Q1 and MOV 146 are disposed in this region. However, this region may be exploited for other purposes and functions. The circuit board 100 includes other components disposed thereon such as indicator LED 148 and test resistor R1.

As alluded to above, this embodiment includes isolation switch 616 disposed on the underside of the printed circuit board 100. The operation of isolation switch 616 will be explained in greater detail below. Suffice it to say for the present that switch 616 works in conjunction with a portion of the reset button assembly 145.

Figure 14:
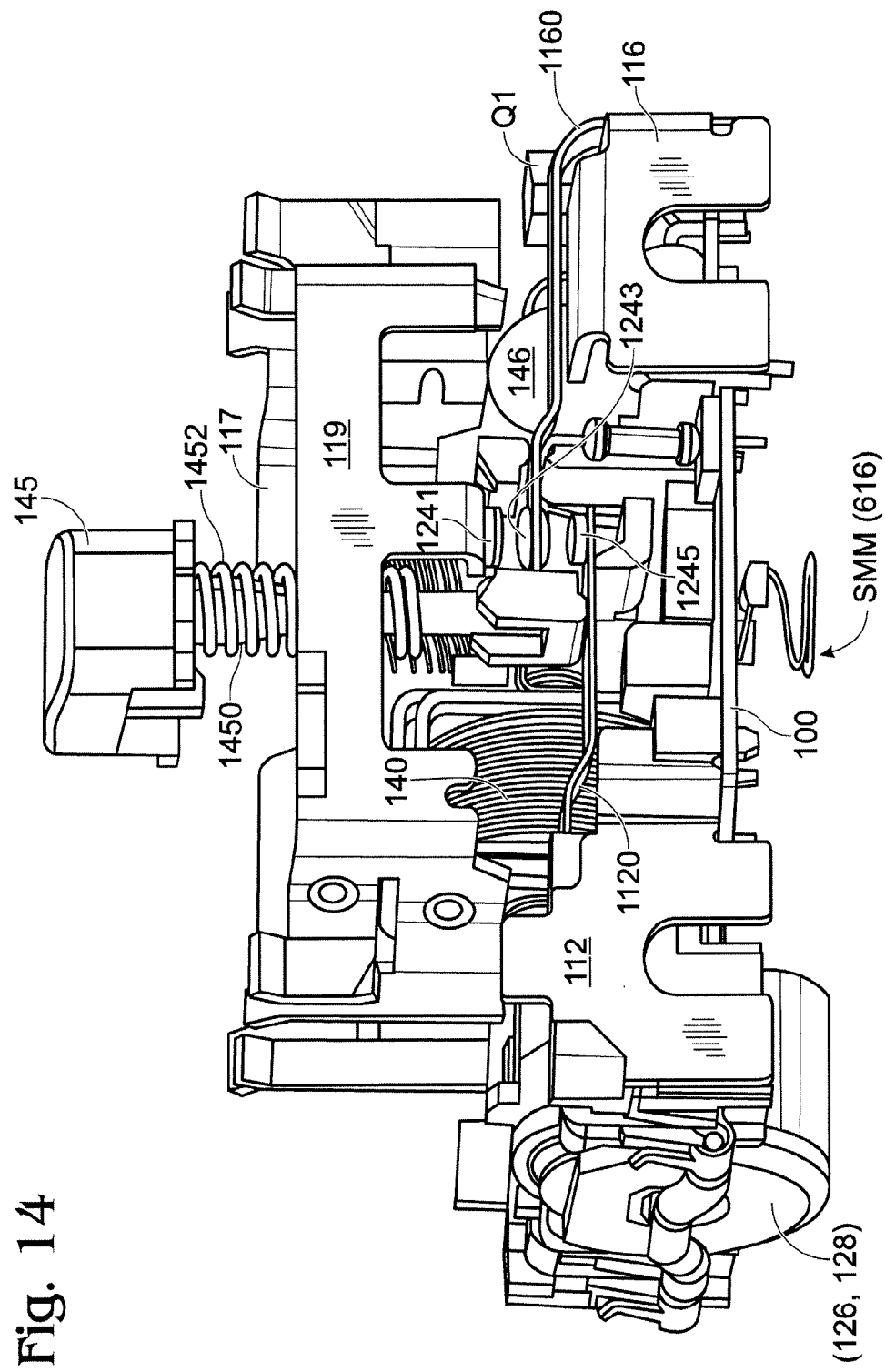
FIG. 14 is a side perspective view of the opposite side of the protective device depicted in FIG. 13.

FIG. 14 is a side perspective view of the opposite side of the protective device depicted in FIG. 13. Thus, the toroidal sensors (126, 128) and the solenoid 140 are seen at the left hand side of the page in this view. Further, the hot receptacle terminal 119 is clearly seen and the neutral receptacle terminal 117 is hidden by the remainder of the assembly. The line hot terminal 112 is connected to the line hot cantilever 1120 which includes line hot contact 1245. The load hot terminals 116 is connected to load hot cantilever 1160 which includes load hot contact 1243. The fixed receptacle contact 1241 is disposed on the underside of the hot receptacle terminal 119. Isolation switch 616 is again shown extending from the underside of the printed circuit board 100.

Figure 15:
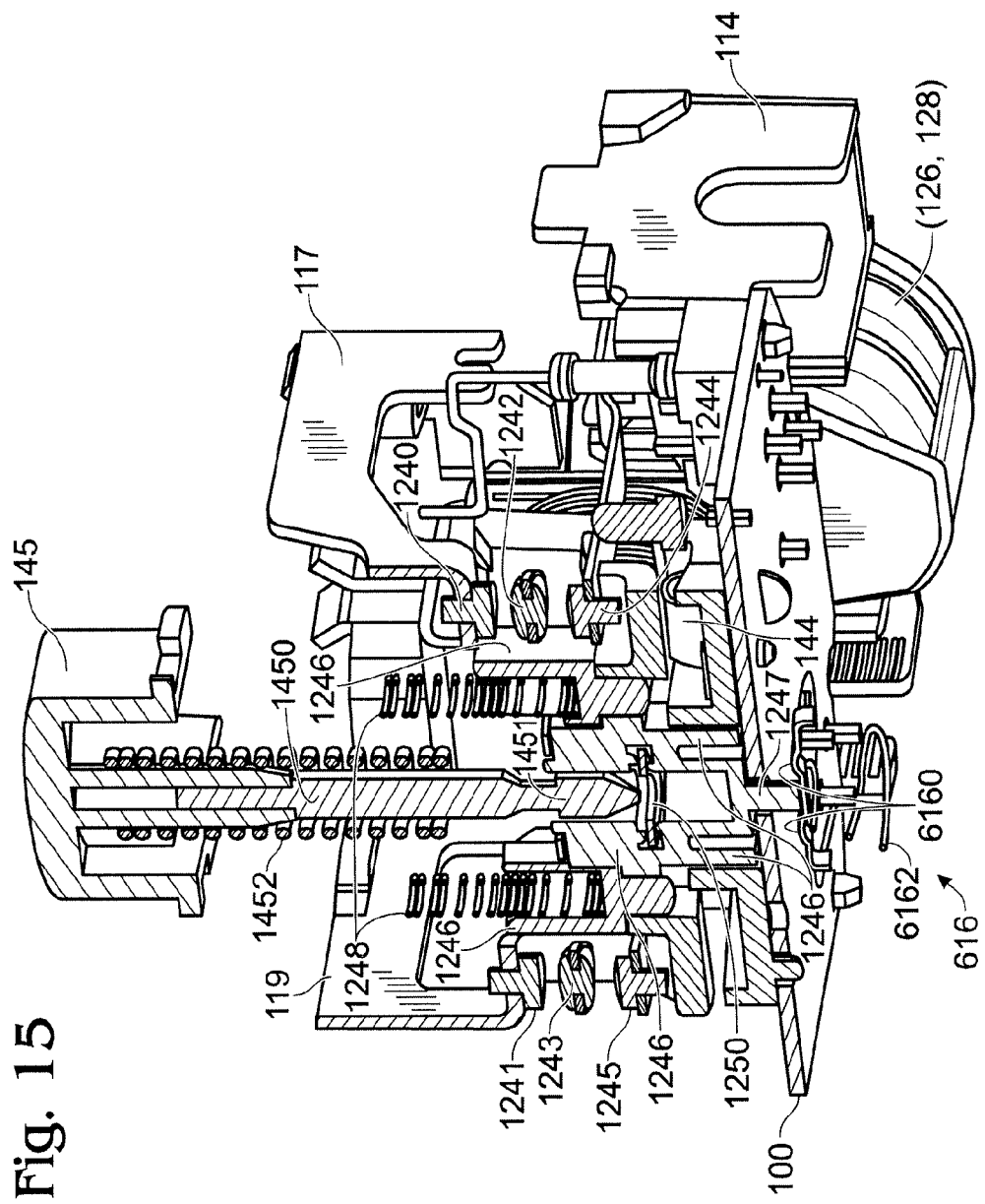
FIG. 15 is a cross-sectional view of an underside portion of the protective device depicted in FIG. 13.

FIG. 15 is a lateral cross-sectional view showing the underside portion of the protective device depicted in FIG. 13. In this view, the hot side of the device 10 is shown on the left side of the page and the neutral side of the device 10 is shown on the right hand side. A description of reference numerals previously described above is omitted for brevity's sake unless it is critical to a thorough understanding of the device. Reset button 145 is connected to a reset pin 1450 that includes a tapered nose portion 1451. A make-spring 1452 is disposed around pin 1450. When the escapement on tapered nose portion 1451 engages the latch 1250, the latch block 1246 is lifted upwardly and the make spring 1452 is compressed such that the hot contacts (1241, 1243, 1245) and the neutral contacts (1240, 1242, 1244) are closed. When the solenoid armature (not shown in this view) dislodges the latch 1250, the latch block and the reset pin 1450 become disengaged and the break-springs 1248 press the latch block downward such that the hot contacts (1241, 1243, 1245) and the neutral contacts (1240, 1242, 1244) are opened. In an alternate embodiment, break-springs 1248 are omitted and the latch block moves downward due to cantilevers 1120, 1140 having self-bias. In yet another embodiment, the latch block moves downward due to the self-biasing force from at least one cantilever and at least one coil spring.

Isolation switch 616 includes bus bar contacts 6160 and contact spring 6162. The bus bar contacts engage contacts disposed on the printed circuit board 100. The latch block 1246 includes a post member 1247 that extends through a central opening in the printed circuit board 100. In the tripped state, the post member 1247 is configured to overcome the make force of the switch spring 6162 such that bus bar contacts 6160 depress switch spring 6162 against an interior surface of the back body and, more importantly, are separated from the switch contacts disposed in printed circuit board 100. In the reset state, switch spring 6162 exerts a make force against the back body member such that the bus bar contacts 6160 are pressed against the printed circuit board switch contact pads to thereby close the switch.

It is also important to note that the bus bar contacts include two air gaps in series. Each air gap between a single bus bar contact and its corresponding printed circuit board contact is within a range that includes 0.045 inches and 0.05 inches. Accordingly, the isolation switch 616 is characterized by a cumulative air gap within a range that includes 0.09 inches and 0.10 inches. The cumulative air gap is configured to withstand a high potential (1240 VAC) test as per UL 943. As such, the isolation switch assures that the line terminals and the load terminals are isolated from each other when circuit interrupter is in the tripped state.

The switch spring 6162 is disposed within a pocket formed in the back body member and is configured to collapse and fold up within itself such that it is approximately the width of a single wire in the tripped state. This feature of switch spring 6162 helps to maximize the air gap.

Figure 16:
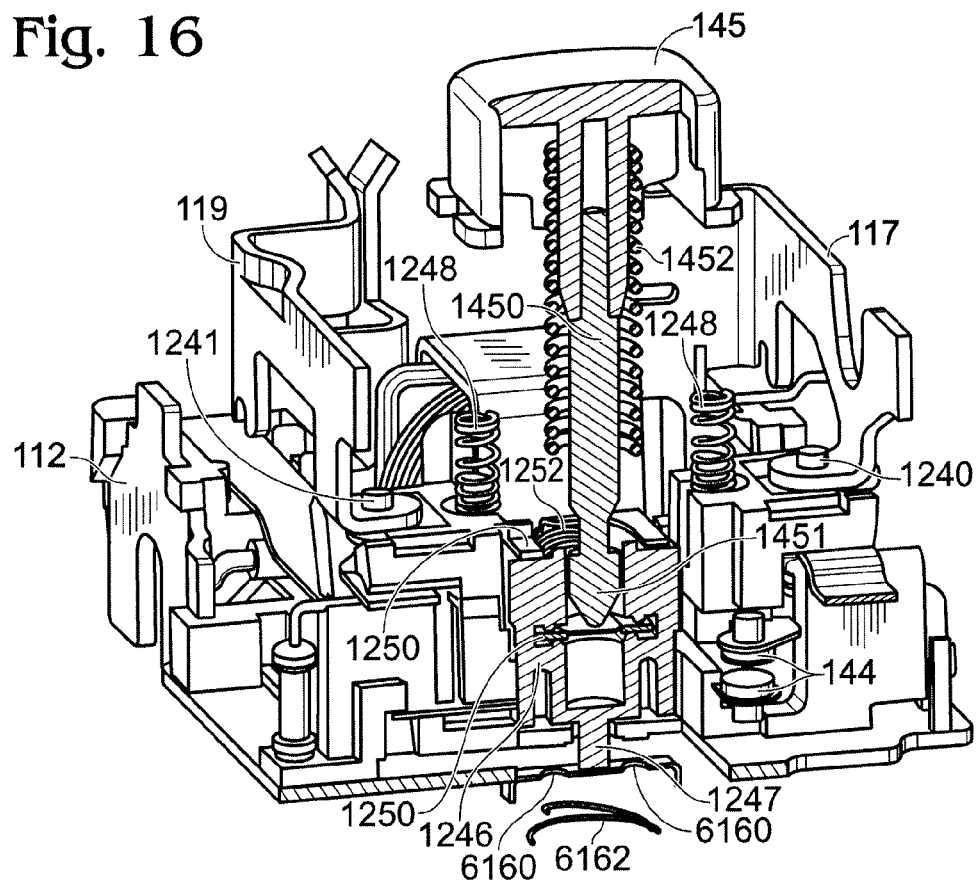
FIG. 16 is a cross-sectional view of a top-side portion of the protective device depicted in FIG. 13.

FIG. 16 is a cross-sectional view of a top-side portion of the protective device depicted in FIG. 13. Again, a description of reference numerals previously described is omitted for brevity's sake unless it is critical to a thorough understanding of the device. For example, this view shows the latch spring 1252 disposed behind the nose portion 1451 of reset pin 1450. In addition, this view provides another perspective of the isolation switch 616 assembly. In particular, the post member 1247 is clearly shown as being pressed against an upper middle portion of the bus bar contact structure 6160. When the circuit interrupter enters the tripped state, latch block 1246 moves in a downward direction due to the self bias of cantilevers 1120, 1140 and/or springs 1248. Post member 1247 moves downwardly through a hole in pc board 100, causing isolation switch 616 to open. Post member 1247 may be integral to latch block 1246.

Figure 17:
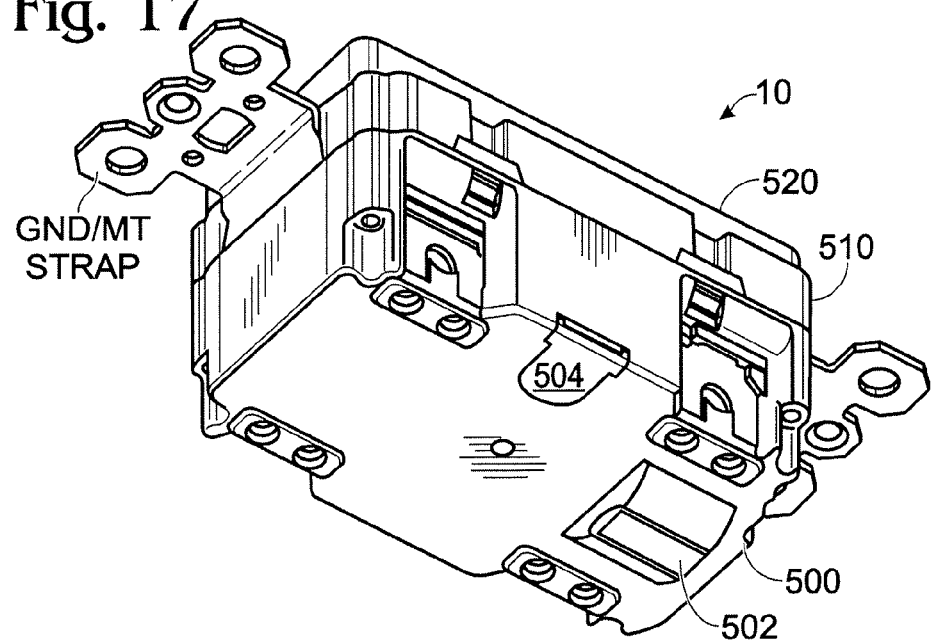
FIG. 17 is a perspective view of a rear cover portion of the protective device in accordance with any of the embodiments depicted in FIGS. 1-12.

FIG. 17 is a perspective view of the protective device enclosure in accordance with any of the embodiments depicted herein. Device 10 includes back body member 500, separator portion 510 and cover member 520. Separator 510 subdivides the interior volume of the device into at least two compartments is substantially hidden by the body member and cover member when they are assembled together. Protrusion 502 accommodates toroids 126, 128. The window 504 provides access to arm the miswire detection circuit 600 after manufacturing and testing. For some embodiments that have been disclosed, the window permits a fusible element to be installed after manufacturing test to arm a miswire circuit. For other embodiments that have been disclosed, the window permits a switching element to be opened or closed to arm a miswire circuit.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed:

1. An electrical wiring device comprising:
  a plurality of line terminals configured to be connected to a source of AC power, and a plurality of load terminals configured to be connected to at least one electrical load;
  a detection assembly coupled to the plurality of line terminals and the plurality of load terminals, the detection assembly being configured to detect a wiring state associated with the plurality of line terminals and the plurality of load terminals, the detection assembly including a primary wiring state detection circuit coupled to the plurality of line terminals, and a secondary wiring state detection circuit coupled to the plurality of load terminals; and
  a circuit interrupting assembly including four sets of interrupting contacts that are configured to provide an electrically continuous path between the plurality of line terminals and the plurality of load terminals in a reset state and interrupt the electrically continuous path in a tripped state, wherein the plurality of line terminals and the plurality of load terminals are substantially isolated from each other in the tripped state.

2. The device of claim 1, wherein the secondary wiring state detection circuit is electrically coupled to the load terminals.

3. The device of claim 2, wherein the primary wiring state detection circuit is magnetically coupled to the plurality of line terminals.

4. The device of claim 1, wherein the primary wiring state detection circuit is magnetically coupled to the plurality of line terminals.

5. The device of claim 1, wherein the primary wiring state detection circuit includes a fault simulation circuit configured to propagate a simulated fault signal simulating a fault condition in the at least one electrical load; and wherein a fault detection circuit is configured to interpret the simulated fault signal as a fault condition and provide the circuit interrupting assembly with a fault detection signal, the circuit interrupting assembly being configured to enter the tripped state in response to the fault detection signal.

6. The device of claim 5, wherein the fault condition is a ground fault condition or an arc fault condition.

7. The device of claim 5, wherein the fault simulation circuit is permanently disabled if the simulated fault signal persists for a predetermined duration.

8. The device of claim 5, wherein the secondary wiring state detection circuit is configured to drive the circuit interrupting assembly to the tripped state independent of the fault detection circuit.

9. The device of claim 1, wherein the primary wiring state detection circuit is configured to provide a wiring state detection signal, the primary wiring state detection circuit including a timing element characterized by a time constant corresponding to a maximum duration of the wiring state detection signal, the circuit interrupting assembly being configured to trip in response to the wiring state detection signal, the timing element permanently preventing reoccurrences of the wiring state detection signal if the maximum duration is exceeded.

10. The device of claim 9, wherein the secondary wiring state detection circuit is configured to drive the circuit interrupting assembly to the tripped state independent of the timing circuit.

11. The device of claim 1, wherein the circuit interrupting assembly comprises a solenoid that effects the tripped state in response to signals generated by the primary wiring state detection circuit and the secondary wiring state detection circuit.

12. The device of claim 11, wherein the primary wiring state detection circuit is coupled to the plurality of line terminals via the solenoid.

13. The device of claim 1, further comprising a fault detector configured to detect a fault condition in the at least one electrical load, the circuit interrupting assembly including an auxiliary switch that couples the fault detector to the plurality of line terminals when in the reset state and substantially decouples the fault detector from the plurality of line terminals when in the tripped state.

14. The device of claim 13, wherein a trip indicator is disposed across the auxiliary switch, the trip indicator providing visible indication or audible indication.

15. The device of claim 1, wherein the plurality of load terminals includes load face terminals and load feed-through terminals, the four sets of interrupting contacts being configured to substantially interrupt the electrical continuity between the load face terminals and the load feed-through terminals when in the tripped state.

16. An electrical wiring device comprising:
  a plurality of line terminals configured to be connected to a source of AC power and a plurality of load terminals configured to be connected to at least one electrical load;
  a detection assembly coupled to the plurality of line terminals, the detection assembly being configured to detect a wiring state associated with the plurality of line terminals and the plurality of load terminals, the detection assembly including a primary wiring state detection circuit configured to be coupled to the plurality of line terminals before a proper wiring state is detected, detect an initial proper wiring state and decouple from the plurality of line terminals in response to detecting the initial proper wiring state; and
  a circuit interrupting assembly including four sets of interrupting contacts that are configured to provide electrical continuity between the line terminals and the plurality of load terminals in a reset state and configured to substantially interrupt the electrical continuity in a tripped state.

17. The device of claim 16, wherein the primary wiring state detection circuit is magnetically coupled to the plurality of line terminals.

18. The device of claim 16, wherein the primary wiring state detection circuit substantially prevents the circuit interrupting assembly from entering the reset state before the initial proper wiring state detection.

19. The device of claim 18, further including a secondary wiring state detection circuit that substantially prevents the circuit interrupting assembly from entering the reset state after the initial proper wiring state detection and if there is a subsequent improper wiring state.

20. The device of claim 19, wherein the secondary wiring state detection circuit is electrically coupled to the load terminals.

21. The device of claim 19, wherein the primary wiring state detection circuit is magnetically coupled to the plurality of line terminals.

22. The device of claim 19, wherein the circuit interrupting assembly comprises a solenoid that effects the tripped state in response to signals generated by the primary wiring state detection circuit and the secondary wiring state detection circuit.

23. The device of claim 22, wherein the primary wiring state detection circuit is coupled to the plurality of line terminals via the solenoid.

24. The device of claim 16, wherein the primary wiring state detection circuit includes a fault simulation circuit configured to propagate a simulated fault signal simulating a fault condition in the at least one electrical load; and wherein a fault detection circuit is configured to interpret the simulated fault signal as a fault condition and provide the circuit interrupting assembly with a fault detection signal, the circuit interrupting assembly being configured to enter the tripped state in response to the fault detection signal.

25. The device of claim 24, wherein the fault simulation circuit is permanently disabled if the simulated fault signal persists for a predetermined duration.

26. The device of claim 24, further including a secondary wiring state detection circuit configured to substantially prevent the circuit interrupting assembly from entering the reset state after the initial proper wiring state detection in the event of a subsequent improper wiring condition.

27. The device of claim 16, the primary wiring state detection circuit is configured to provide a primary wiring state detection signal, the primary wiring state detection circuit including a timing element characterized by a time constant corresponding to a maximum duration of a primary wiring state detection signal, the circuit interrupting assembly being configured to trip in response to the primary wiring state detection signal, the timing element permanently preventing reoccurrences of the wiring state detection signal if the maximum duration is exceeded.

28. The device of claim 16, further comprising a fault detector configured to detect a fault condition in the at least one electrical load, the circuit interrupting assembly including an auxiliary switch that couples the fault detector to the plurality of line terminals when in the reset state and substantially decouples the fault detector from the plurality of line terminals when in the tripped state.

29. The device of claim 28, wherein a trip indicator is disposed across the auxiliary switch, the trip indicator providing visible indication or audible indication.

30. The device of claim 16, wherein the plurality of load terminals includes load face terminals and load feed-through terminals, the four sets of interrupting contacts being configured to substantially interrupt the electrical continuity between the load face terminals and the load feed-through terminals when in the tripped state.

31. The device of claim 16, wherein the primary wiring state detection circuit substantially prevents the circuit interrupting assembly from maintaining the reset state when there is an improper wiring condition but does not prevent the circuit interrupting assembly from maintaining the reset state after the initial proper wiring state has been detected.

32. The device of claim 16, wherein the primary wiring state detection circuit includes a bi-stable structure disposed in a first state before the initial proper wiring state detection and disposed in a second state after the initial proper wiring state detection.

33. The device of claim 32, wherein the bi-stable structure includes a fusible device.

34. The device of claim 32, wherein the bi-stable structure includes a switching element.

35. The device of claim 16, further including a secondary wiring state detection circuit configured to prevent the circuit interrupting assembly from maintaining the reset state if an improper wiring condition occurs after the initial proper wiring state detection.

36. The device of claim 35, wherein the secondary wiring state detection circuit includes a manual user accessible button.

37. The device of claim 36, wherein the manual user accessible button initiates a simulated test signal that simulates a fault condition in the at least one electrical load.

38. The device of claim 37, wherein the fault condition is a ground fault condition or an arc fault condition.

39. The device of claim 36, wherein the manual user accessible button is a test button.

40. A method comprising:
providing an electrical wiring device including a plurality of line terminals configured to be connected to a source of AC power and a plurality of load terminals configured to be connected to at least one electrical load, the device also including a circuit interrupting assembly having four sets of interrupting contacts that are configured to provide an electrically continuous path between the plurality of line terminals and the plurality of load terminals in a reset state and interrupt the electrically continuous path in a tripped state, wherein the plurality of line terminals and the plurality of load terminals are substantially isolated from each other in the tripped state;
enabling a first wiring state detection structure to automatically trip a circuit interrupting assembly when there is a miswired condition; and
disabling the first wiring state detection structure once there is a properly wired condition.

41. The method of claim 40, further including manually tripping the circuit interrupting assembly by way of a user accessible button, and substantially preventing the reset state via a second wiring state detection structure when there is the miswired condition.

42. An electrical wiring device comprising:
a plurality of line terminals configured to be connected to a source of AC power and a plurality of load terminals configured to be connected to at least one electrical load;
a circuit interrupting assembly including four sets of interrupting contacts that are configured to provide electrical continuity between the line terminals and the load terminals in a reset state and configured to substantially interrupt the electrical continuity in a tripped state;
a fault detection assembly coupled in the reset state to the plurality of line terminals, the fault detection assembly being configured to detect at least one fault condition in the at least one electrical load and drive the circuit interrupting assembly to the tripped state in response to the detection of the at least one fault condition; and
a wiring state detection assembly coupled to the fault detection assembly, the wiring state detection assembly being configured to detect a wiring state associated with the plurality of line terminals and the plurality of load terminals, the wiring state detection assembly including a primary wiring state detection circuit configured to be coupled to the plurality of line terminals before an initial proper wiring state is detected, detect the initial proper wiring state and decouple from the plurality of line terminals in response to detecting the initial proper wiring state, the wiring state detection circuit also including a second circuit including a user-accessible manual switch coupled to a memory structure, a wiring state being read before an actuation of the manual switch and stored in the memory structure, the second circuit being configured to prevent the circuit interrupting assembly from maintaining the reset state after the manual switch is actuated if the wiring state is indicative of a miswired state.

43. The device of claim 42, wherein the primary wiring state detection circuit includes a bi-stable structure disposed in a first state before the initial proper wiring state detection and disposed in a second state after the initial proper wiring state detection.

44. The device of claim 43, wherein the bi-stable structure includes a fusible device.

45. The device of claim 43, wherein the bi-stable structure includes a switching element.

46. The device of claim 42, wherein the manual switch includes a test button.

47. The device of claim 42, wherein the primary wiring state detection circuit is configured to trip the circuit interrupting assembly to prevent the reset state from being maintained.

48. The device of claim 42, wherein the memory structure includes a capacitor element.

49. The device of claim 42, wherein the memory structure includes a capacitor element coupled to a switch element.

50. The device of claim 49, wherein the switch element includes at least one transistor.

51. The device of claim 42, wherein the manual switch is coupled to the memory structure via the plurality of load terminals.

52. The device of claim 42, wherein the fault detection assembly is coupled to the plurality of line terminals in the reset state and substantially decoupled from the plurality of line terminals in the tripped state.

* * * * *